US012339571B2

(12) United States Patent
Astoria et al.

(10) Patent No.: US 12,339,571 B2
(45) Date of Patent: Jun. 24, 2025

(54) HEADREST PROJECTOR MOUNT AND CONTENT DELIVERY SYSTEM

(71) Applicant: Pranos Inc., San Francisco, CA (US)

(72) Inventors: David Astoria, Salt Lake City, UT (US); William Stanislaus, Fremont, CA (US)

(*) Notice: Subject to any disclaimer, the term of this patent is extended or adjusted under 35 U.S.C. 154(b) by 242 days.

(21) Appl. No.: 18/048,408

(22) Filed: Oct. 20, 2022

(65) Prior Publication Data

US 2023/0120041 A1    Apr. 20, 2023

Related U.S. Application Data

(60) Provisional application No. 63/257,951, filed on Oct. 20, 2021.

(51) Int. Cl.
  *G03B 21/14*    (2006.01)
  *G03B 29/00*    (2021.01)
  *H04N 9/31*     (2006.01)

(52) U.S. Cl.
  CPC ........... *G03B 21/145* (2013.01); *G03B 29/00* (2013.01); *H04N 9/3141* (2013.01)

(58) Field of Classification Search
  CPC .... G03B 21/142; G03B 21/145; G03B 29/00; H04N 9/3141; H04N 9/3185; G09F 27/00; G09F 19/18; G09F 21/0485; G09F 21/048; B60N 2/879
  See application file for complete search history.

(56) References Cited

U.S. PATENT DOCUMENTS

| | | | |
|---|---|---|---|
| 9,584,890 B1* | 2/2017 | Tuccinardi | H04R 5/04 |
| 2009/0268164 A1* | 10/2009 | Bowden | B60K 35/22 |
| | | | 353/13 |
| 2014/0299738 A1* | 10/2014 | Runger | F16M 11/123 |
| | | | 248/661 |
| 2018/0254001 A1* | 9/2018 | Koren | G06Q 30/0261 |
| 2020/0139896 A1* | 5/2020 | Smith | B60R 11/0235 |

* cited by examiner

*Primary Examiner* — Sultan Chowdhury
(74) *Attorney, Agent, or Firm* — Novel Patent Services LLC

(57) ABSTRACT

A vehicle-based mobile content delivery system comprises a projector configured to receive and project visual content, a projection surface for receiving and displaying the projected visual content, and a projector mounting system for securely mounting the projector and integrating the projector into a vehicle. The projector mounting system comprises a headrest projector mount compatible with an original headrest of the vehicle for enclosing and supporting the projector, a headrest coupling mechanism for coupling the projector to the headrest projector mount for support, and mounting channels that accommodate a range of headrest mounting rails of vehicles for connecting the projector mounting system to the vehicle.

12 Claims, 44 Drawing Sheets

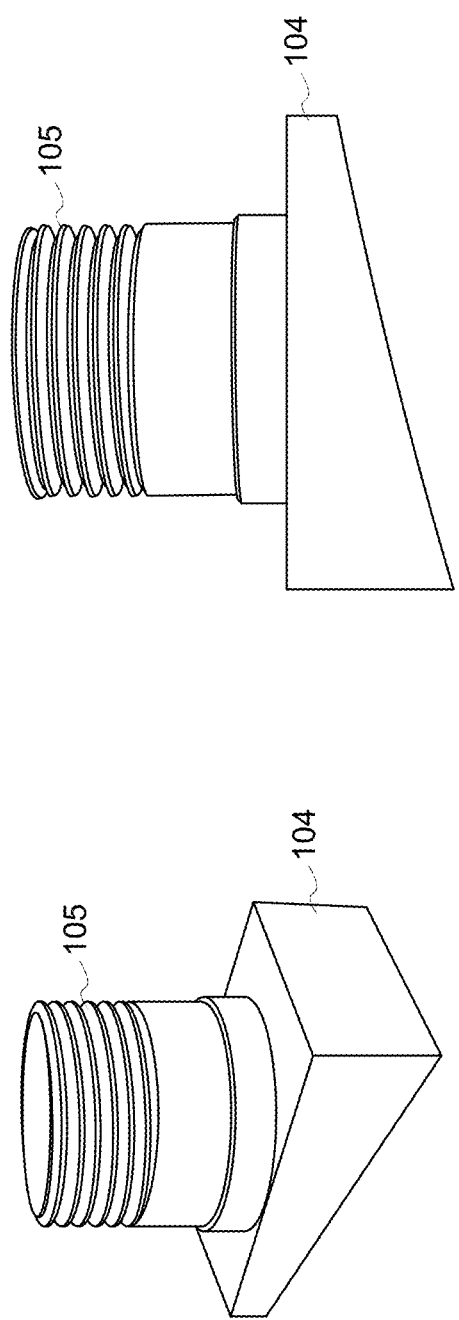
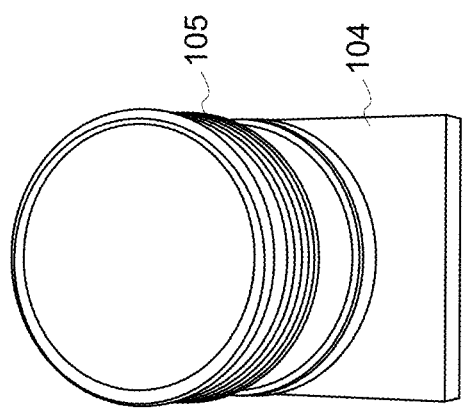

HEADREST PROJECTOR MOUNT AND CONTENT DELIVERY SYSTEM

PRIORITY

This application claims the benefit under 35 U.S.C. § 119(e) of U.S. Provisional Patent Application No. 63/257,951, filed 20 Oct. 2021, which is incorporated herein by reference.

TECHNICAL FIELD

This disclosure generally relates to targeting delivery of media content using highly mobile displays and mounting system for use in the displays.

BRIEF DESCRIPTION OF THE DRAWINGS

FIGS. 7A-7C illustrate vies of an example insert for a ball joint according to embodiments disclosed herein.

DESCRIPTION OF EXAMPLE EMBODIMENTS

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

This disclosure relates to a system for providing content delivered at a variety of displays, but particularly a display comprising an image or video projected from a projector mounted to or incorporated within a headrest of a vehicle (e.g., automobile) onto a window of the vehicle. Embodiments disclosed herein include apparatuses and components for securely mounting the projector and seamlessly integrating the projector into the features of the vehicle. Embodiments disclosed herein further include systems and methods for controlling the delivery of content through the projector. Embodiments of the disclosed system can be incorporated in a number of vehicles comprising one or more such mobile displays communicatively coupled to a content server. In particular embodiments, the content server may be made available locally (e.g., incorporated into the display or stored on the vehicle itself). In particular embodiments, the content server may be a network-accessible centralized content server. The content server may provide content according to the preferences of a user, such as the operator of a vehicle, an advertising customer, a government actor, a broadcast partner, etc. The content server may be controlled by a customized application for interfacing with the content server that is executing on, for example, a smartphone of a user and/or operator of a display-equipped vehicle.

Figure 1:
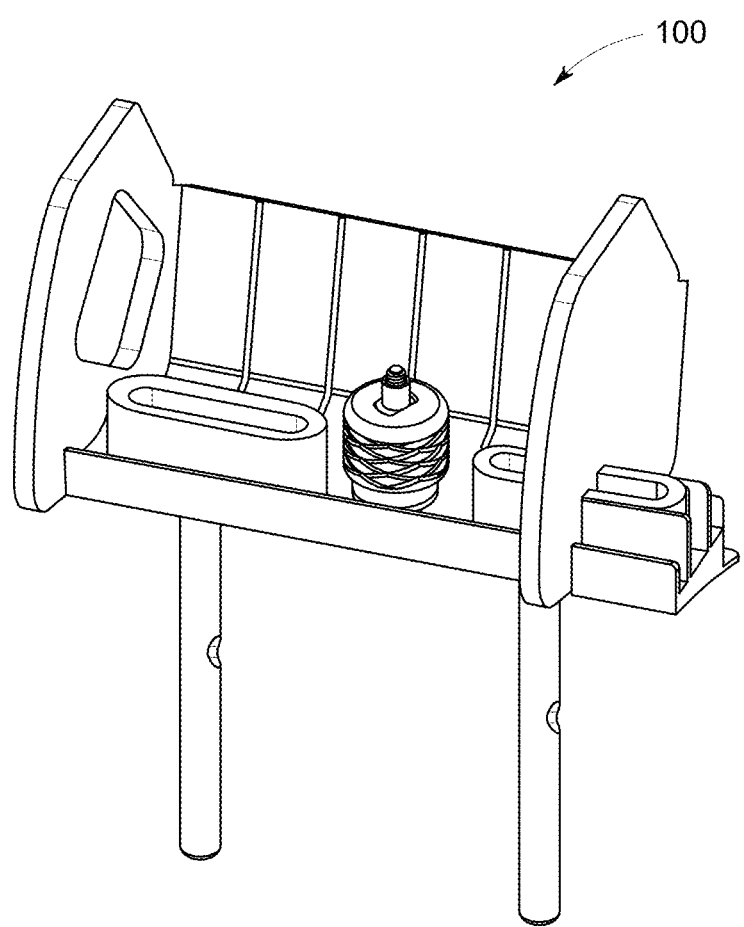
FIG. 1 illustrates an example headrest projector mount according to embodiments disclosed herein.
Figure 12A:
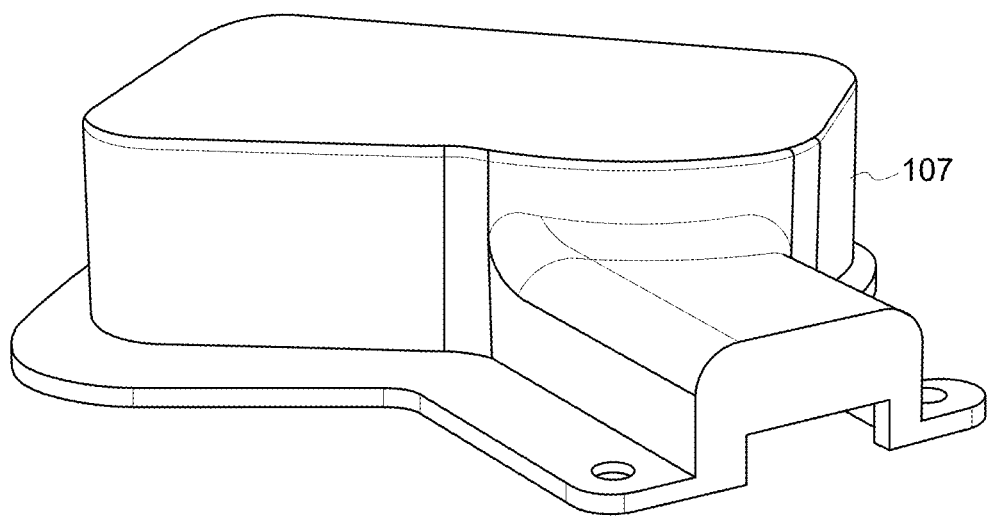
FIGS. 12A-12D illustrate views of an example cable cover for a headrest projector mount according to embodiments disclosed herein.
Figure 12B:
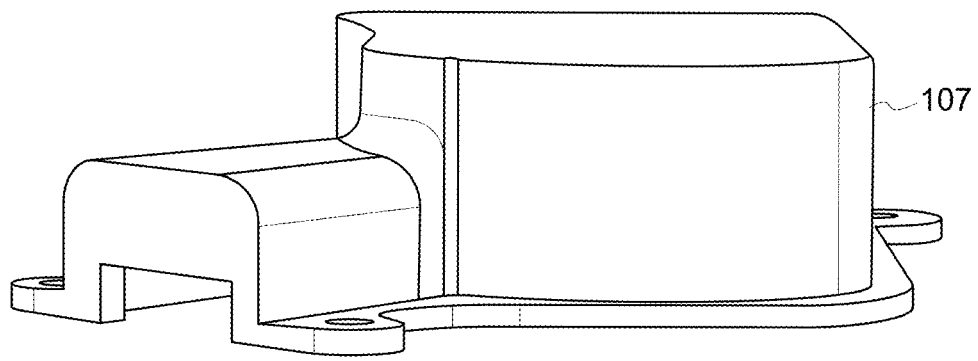
Figure 12C:
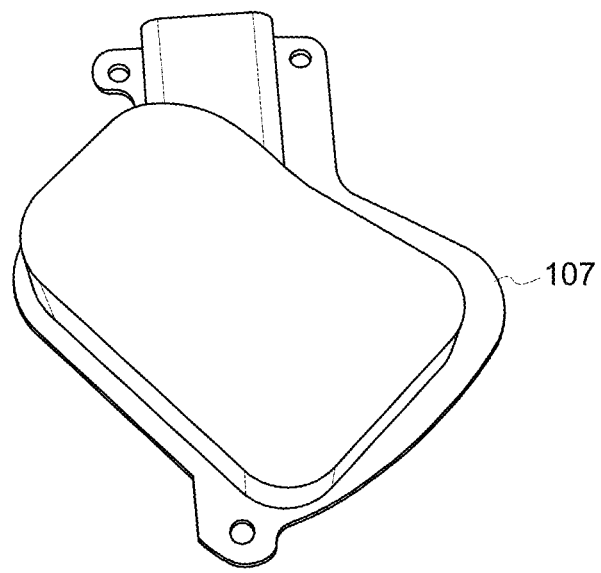
Figure 12D:
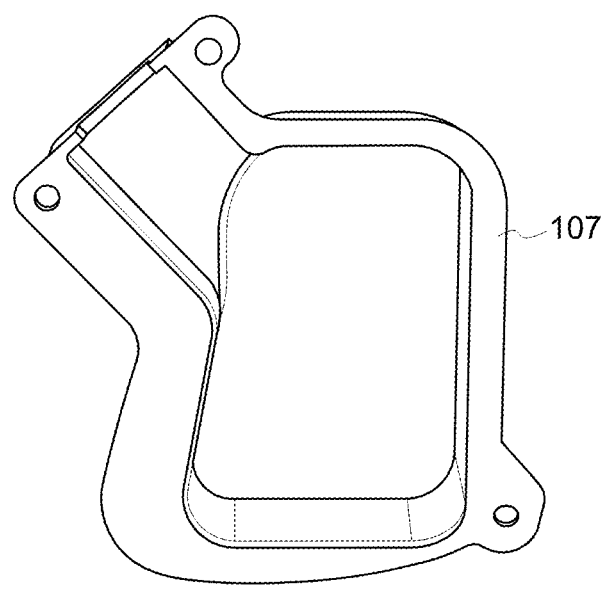

FIG. 1 illustrates an example headrest mount 100 for a projector. The headrest mount 100 can be installed in a vehicle by removing one of the headrests (e.g., a center backseat headrest) and replacing the headrest mount 100 therewith. The headrest mount 100 can be compatible with most vehicles through the use of mounting rails 108 (discussed with respect to FIGS. 12A-12B) that are compatible to be secured within the headrest mounting positions of the vehicle. The headrest mount 100 includes a number of components which together allow for the secure installation of a wide range of compatible projectors. Moreover, once installed, the headrest mount 100 can be covered so as to appear to be a standard headrest and can further be reinforced to operate as a standard headrest for passengers of the vehicle. Therefore, through use the apparatuses disclosed herein, a projector based display can be added to the vehicle without sacrificing standard safety and/or comfort features of the vehicle.

Figure 2:
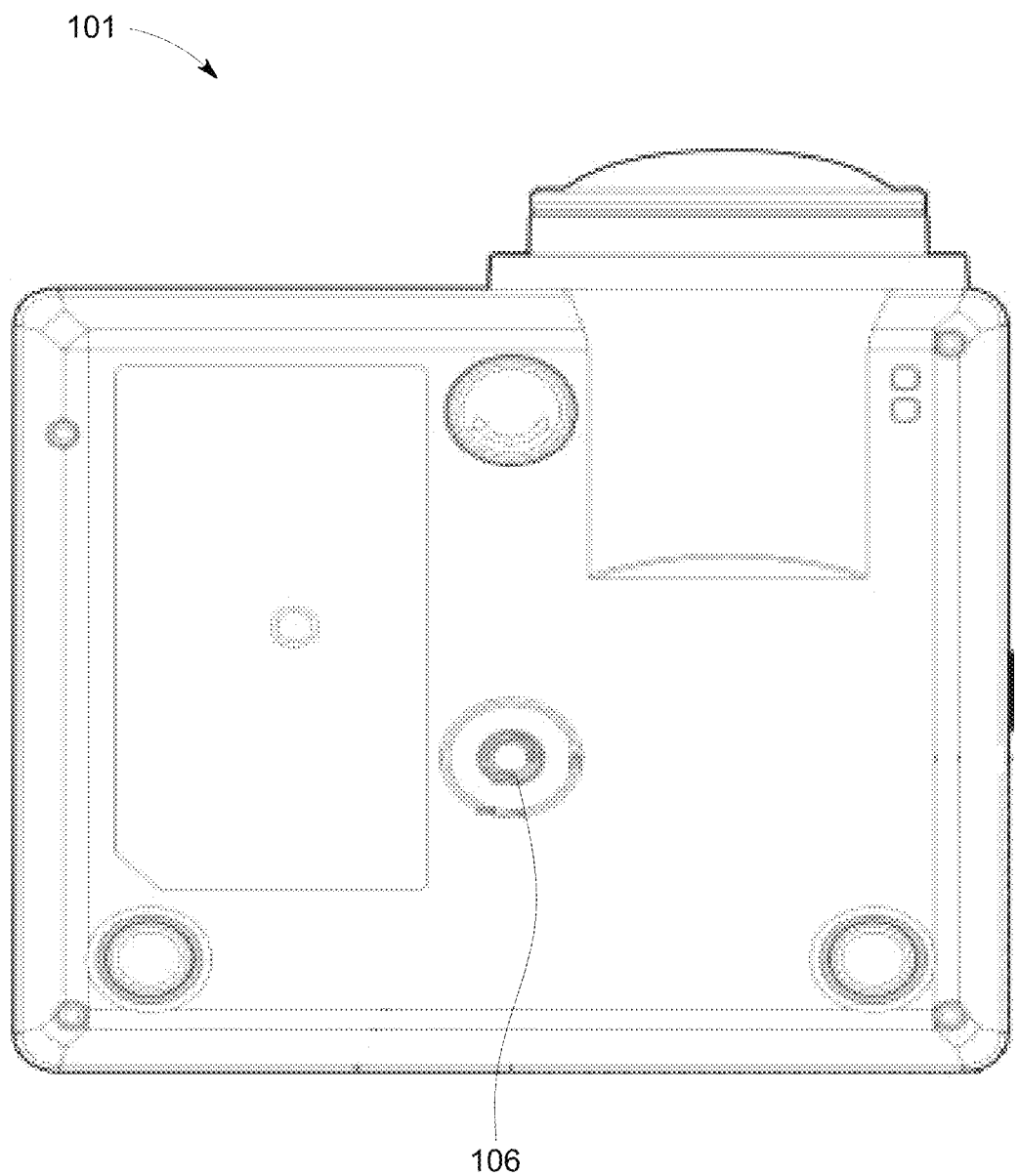
FIG. 2 illustrates a schematic for an example projector according to embodiments disclosed herein.

FIG. 2 shows a schematic view for a projector 101 that can be compatible with the headrest mount 100 as embodied herein. In particular embodiments, the projector 101 can include one or more coupling mechanisms to allow for the projector to be mounted, e.g., to a tripod, wall, or ceiling mount. For example, the projector 101 can include a mounting hole 101A for a screw that is passed through the mount (e.g., a mounting component of a tripod) and fixedly attached to the projector 101. The screw can couple the body of the projector 101 to the mount, preventing the projector 101 from moving separately from the mount. In particular embodiments, the projector 101 can include other mount mechanisms intended to use the same mounting location that are modified to accept amounting screw provided by the headrest mount 100 embodied herein.

The projector 101 may include the features and specifications including the following. The projector 101 may be capable of projecting a brightness level meeting a threshold suitable for display of clear images in direct sunlight. As an example, the projector 101 may have a minimum 500 lumen brightness with an ultra short throw capability. The projector 101 may have a brightness range of at least 500 lumen to 3000 lumen or more. The projector 101 may have networking components suitable to communicate with local devices (e.g., through Bluetooth, Bluetooth Low Energy, WiFi, NFC, ZigBee, or similar) as well as networking components to facilitate communication with remote devices (e.g., WiFi, cellular radios) including remote cloud servers. In particular embodiments, the projector 101 can be configured to maintain an expected level of power consumption during operation (e.g., less than 75 watts) and a suitable noise level so as to not disturb passengers of the vehicle while in operation (e.g., less than 23 dB). This disclosure describes the use of multiple types of projectors and projector mounts including the rear-facing headrest mount 100 shown in FIG. 1 as well as a side-facing projector mount 100 shown in FIG. 17. As described herein, projectors used in a rear facing configuration can also be communicatively coupled with a controller for an adjustable rear projection film that modifies the opacity of the rear window of a vehicle.

In particular embodiments, the projector 101 can include additional features beyond standard projectors. For example, the project can include or be communicatively coupled with a location-determination component (e.g., cellular radios for triangulation, GPS). The projector 101 can use the location-determination component to record the location of the vehicle and may associate the location of the vehicle with the content being displayed as described further herein. Additionally or alternatively, the project can include a crowd determination component. The crowd determination component can, for example, act as a beacon using one or more communication protocols (e.g., Bluetooth Low Energy) to determine a number and possibly identity of nearby devices. This determination can also be associated with particular multimedia content being displayed. The projector 101 may be modular, so that a user can easily add in additional hardware features, such as networking, location-determination, and crowd determination features.

Figure 3A:
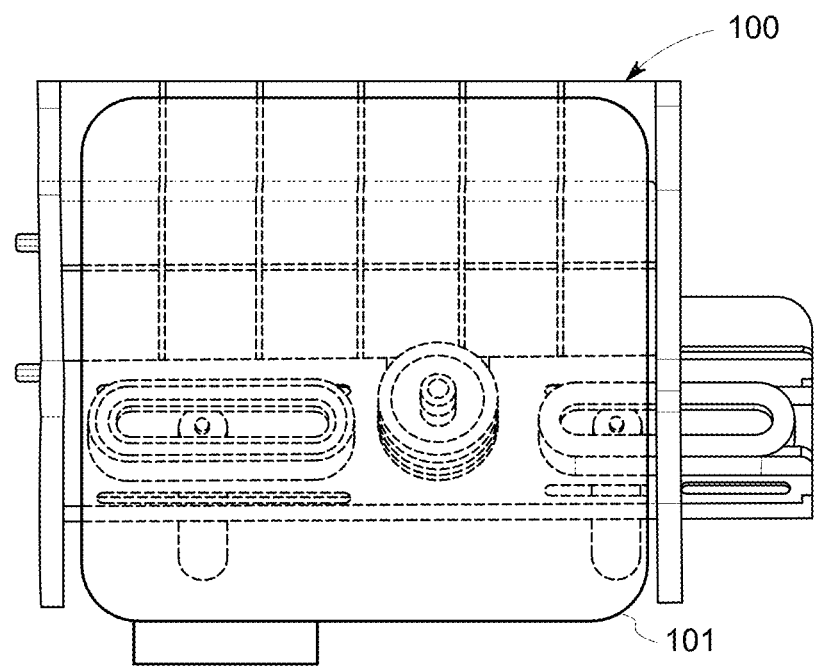
FIGS. 3A-3B illustrate views of an example projector and headrest projector mount according to embodiments disclosed herein.
Figure 3B:
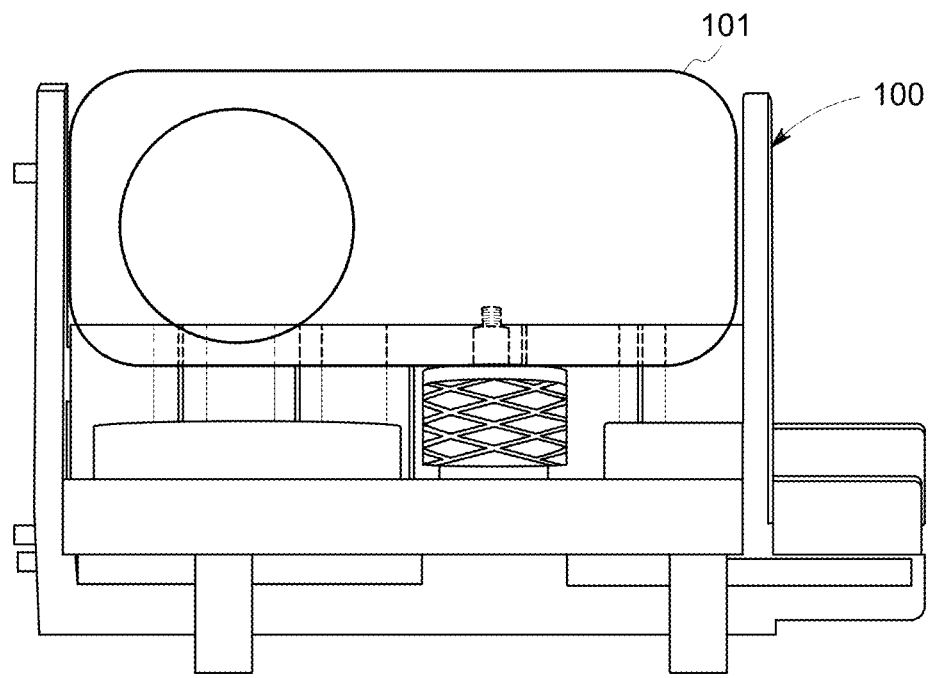

FIGS. 3A-3B show approximate mounting locations for a projector 101 (e.g., the projector corresponding to FIG. 2) within the headrest projector mount 100 of FIG. 1. FIG. 3A corresponds to a top view, with the projector facing out of the back of the mount, such that the top of the image can form a portion of the headrest against which a passenger of the vehicle can rest their head. FIG. 3B illustrates a front view, with the projector facing the viewer. As can be seen, the mounting location on the projector mates with a corresponding mounting screen on the projector 101 that is supported by a ball joint and collar, described herein.

Figure 4A:
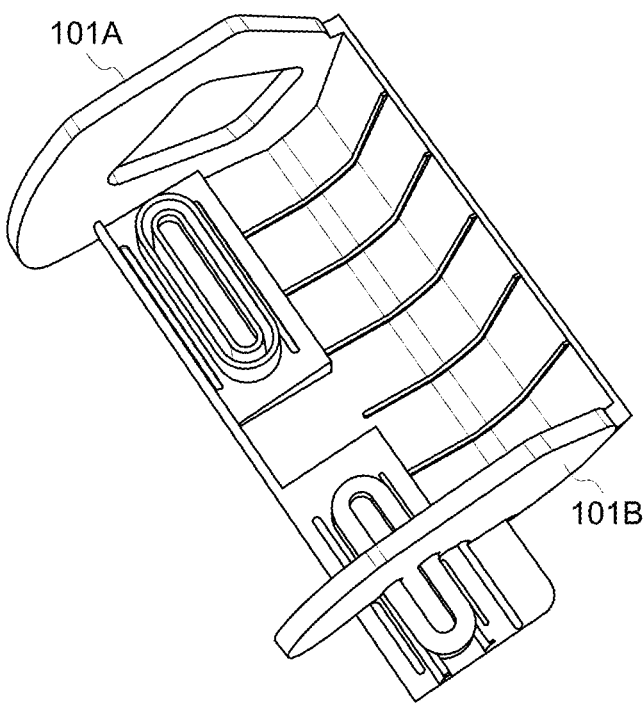
FIGS. 4A-4C illustrate views of an example headrest projector mount base and example sidewalls according to embodiments disclosed herein.
Figure 4B:
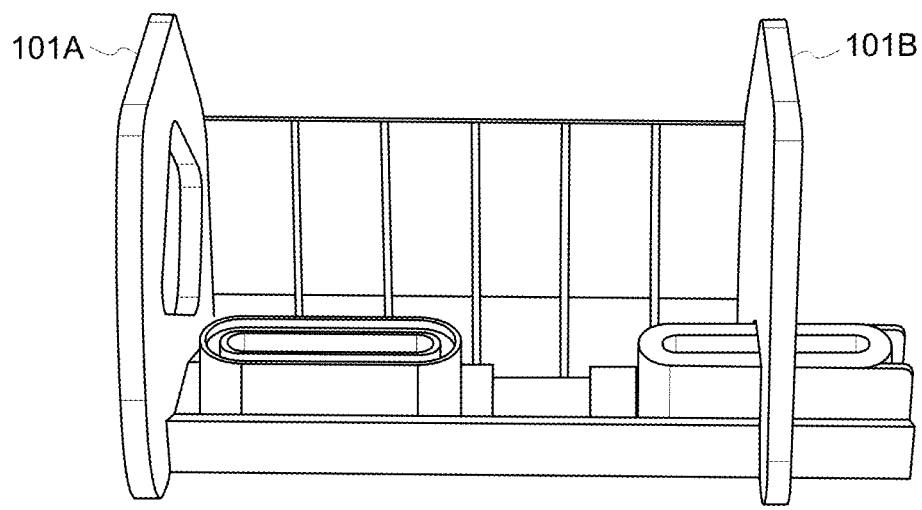
Figure 4C:
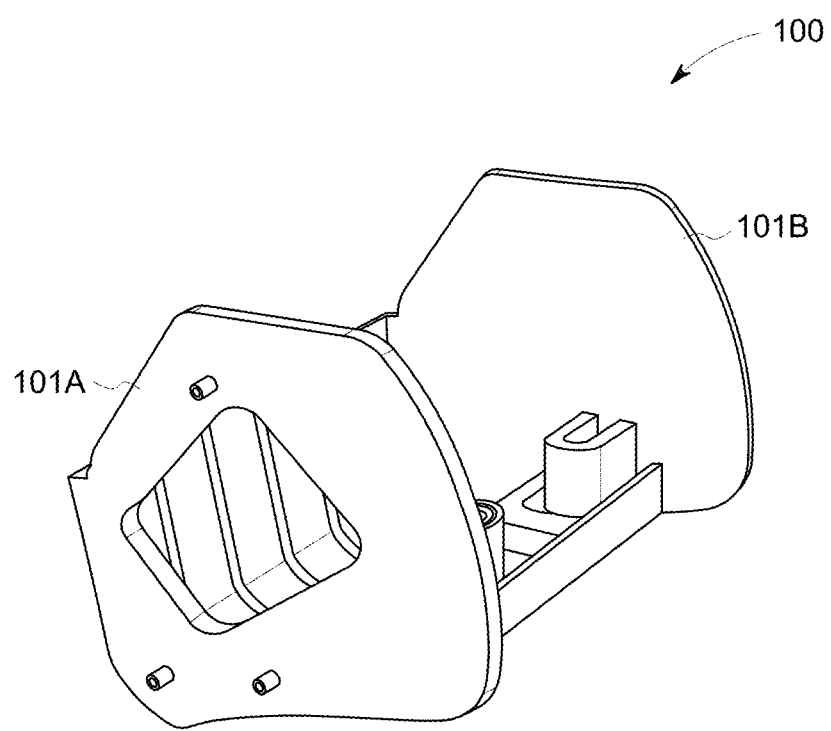

FIGS. 4A-4C illustrate example views of the headrest mount 100 including sidewalls 106A, 106B for the mount. FIG. 4A illustrates a top-oriented view. FIG. 4B illustrates a front view. FIG. 4C illustrates a skewed side view.

Figure 5:
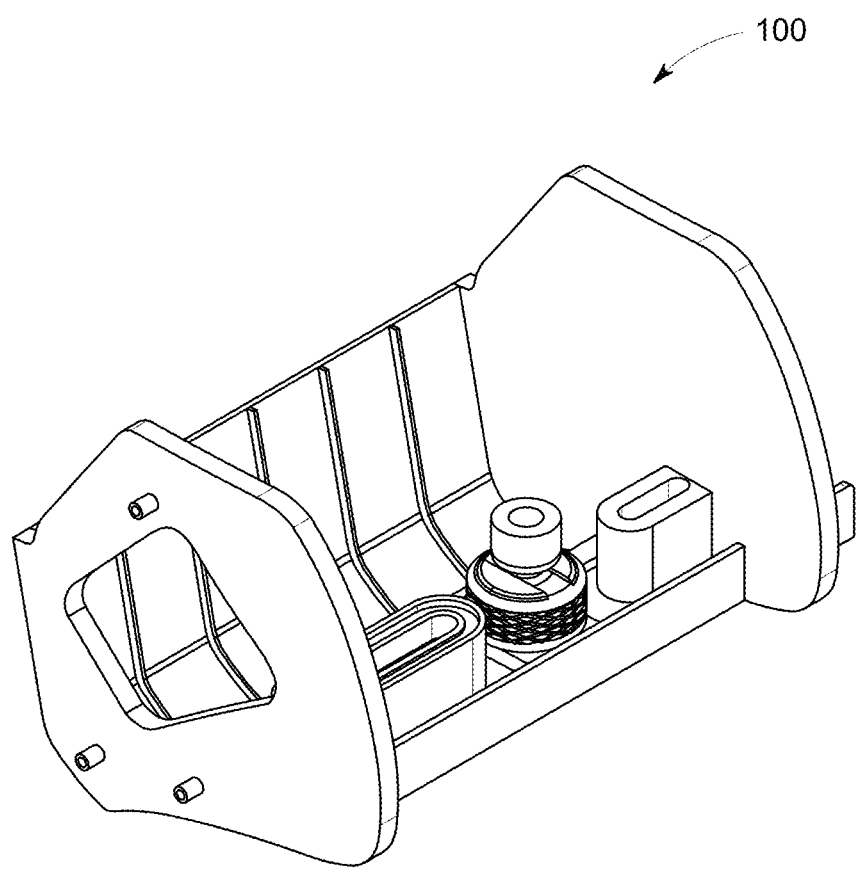
FIG. 5 illustrates a view of an example headrest projector mount base with ball joint according to embodiments disclosed herein.

FIG. 5 illustrates a view of the headrest mount 100 including a ball joint 103 and collar 102 which is used to couple to the projector 101. Two channels adjacent and running parallel to the ball joint 103 and collar 102 accommodate the mounting rails. The channels further allow adjustment of the mounting rails to accommodate vehicles with wider or narrower headrest mounting rail fixation points. In particular embodiments, the minimum distance between mounting rails, designated by the minimum distance between the inner portions of the channels may be chosen to accommodate the narrowest headset rail distance among publicly available vehicles. The mounting channels may also allow for the headrest mount 100 to be laterally adjusted such that the central point of images projected from the projector 101 may adjust. In particular, the projected image may be centered on the rear window of the vehicle in which the projector 101 is mounted.

Figure 6:
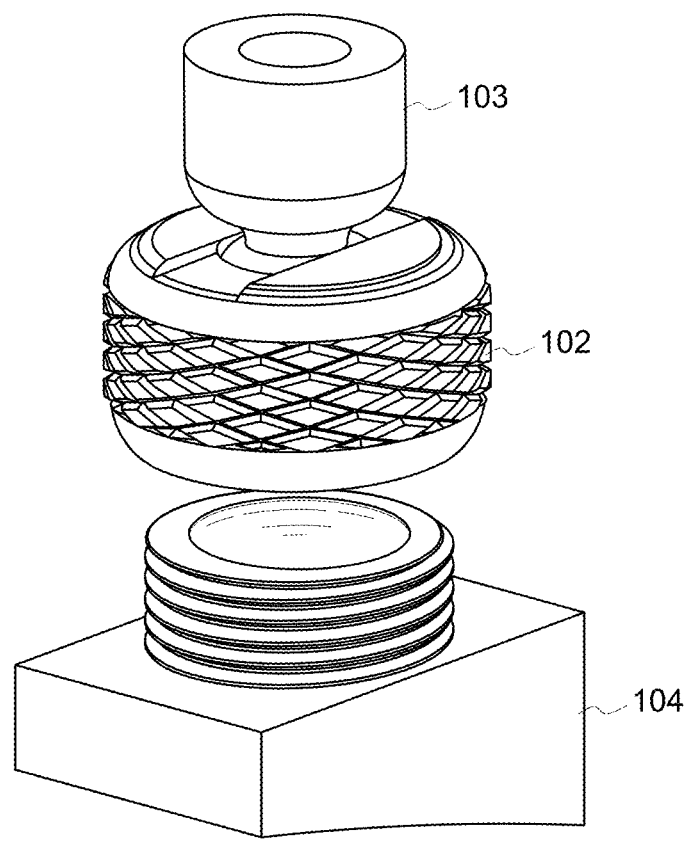
FIG. 6 illustrates an example ball joint according to embodiments disclosed herein.
Figure 8:
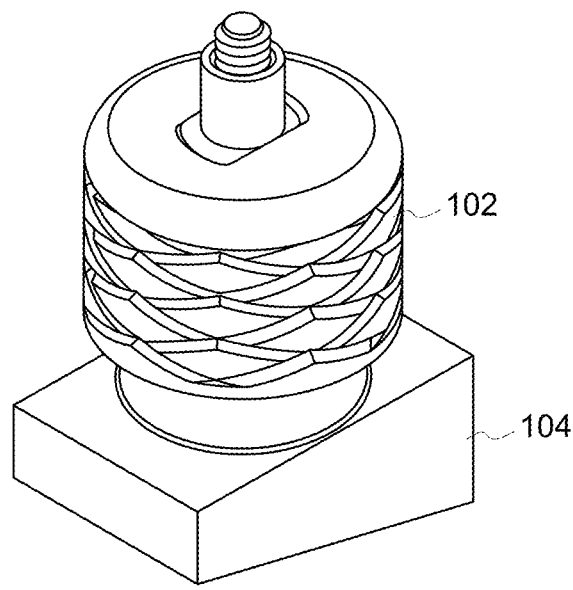
FIG. 8 illustrates an example collar for a ball joint according to embodiments disclosed herein.
Figure 9:
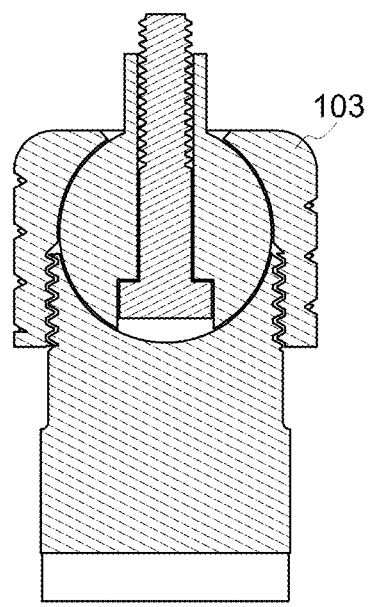
FIG. 9 illustrates a schematic view of a ball joint according to embodiments disclosed herein.
Figure 10:
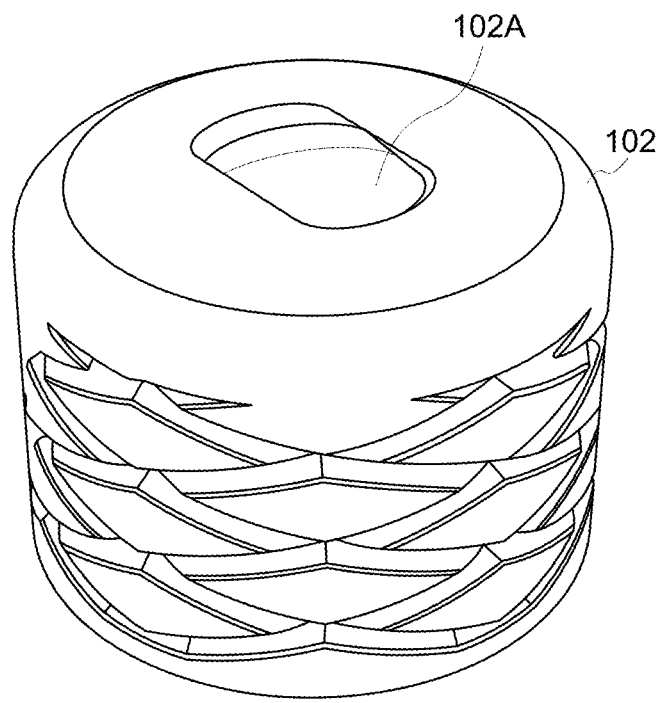
FIG. 10 illustrates an example collar for a ball joint according to embodiments disclosed herein.
Figure 11:
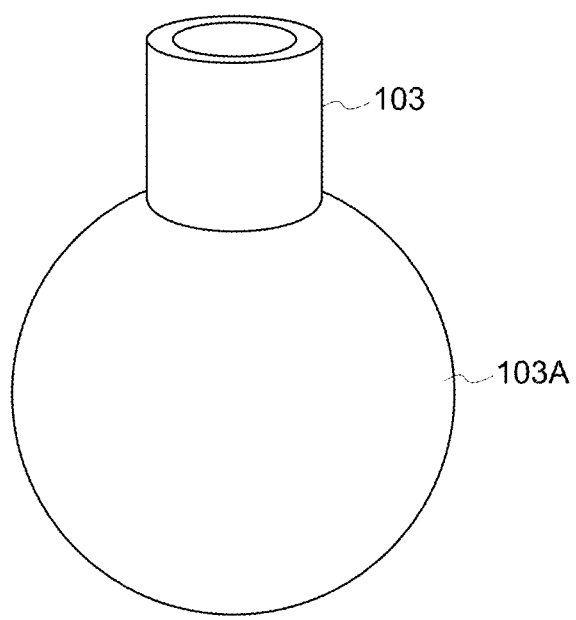
FIG. 11 illustrates an example component of a ball joint according to embodiments disclosed herein.

FIG. 6 illustrates an expanded view of a ball joint 103 and collar 102 which may be used with the headrest mount 100 described herein (e.g., illustrated in FIG. 1). The ball joint 103 and collar 102 may include a ball joint insert 105 (e.g., shown in FIGS. 7A-7C) which couples to the headrest mount base 104. The collar 102, e.g., shown in FIGS. 8 and 10 may be used to tension and protect the ball joint 103 such it adds friction to moving the ball joint 103. The collar 102, therefore, may reduce the accidental or unintended movement of the ball joint 103 (and, thus, the mounted projector). The ball joint 103 shown in FIG. 6 may further include the ball portion 103A, shown in FIG. 11. The ball portion 103A meets and opposes the upper portion of the insert shown in FIGS. 7A-7C. The radius of the ball portion 103A may be configured, in particular, to match the arc of the impression on the top portion of the insert. This may maximize the range of motion of the ball joint 103. The collar 102 may include an aperture 102A through which an extending member of the ball portion 103A may pass. The collar 102 may then be screwed onto the insert portion to hold the ball portion 103A in place. In particular embodiments, a bolt may be inserted into the ball portion 103A and extend outward from the extending member of the ball portion 103A. As embodied herein, the bolt may be configured to match a mounting location of a projector 101. In particular embodiments, the bolt may be removable or interchangeable with different sized bolts to accommodate different projectors and/or mounting locations. FIG. 9 illustrates a cross-section view of the ball joint 103, showing the ball portion 103A seated to an insert with a collar holding the ball portion in position by virtue of mating grooves on the collar 102 which match opposing mating grooves on the insert. A bolt is seated in the ball portion 103A and extends outward through the extending member of the ball portion 103A and through the collar 102.

FIGS. 12A-12D illustrate an example cable cover 107 that may be used with the headrest mount 100 to secure and obscure the cables necessary to run to the projector 101 (e.g., power, data, networking, etc.).

Figure 13A:
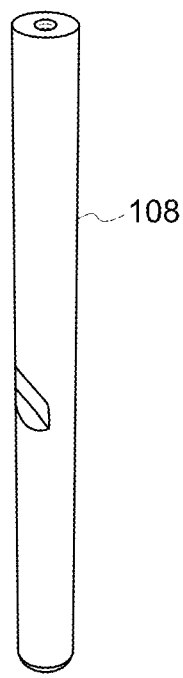
FIGS. 13A-13B illustrate views of an example mount rail according to embodiments disclosed herein.
Figure 13B:
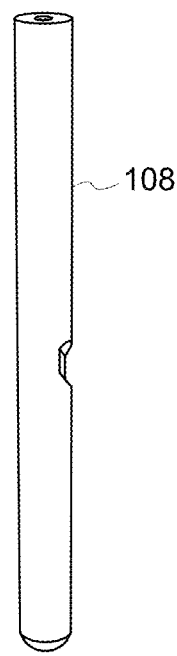

FIGS. 13A-13B illustrate example mounting rails 108 that may be used with the projector headrest mount 100 illustrated and described herein. In particular embodiments, the mounting rails 108 may include a slot partway down the rail on one or more sides. The slot may be used to meet a panel or holding component of the headrest of the vehicle to which the projector headrest mount 100 is attached.

Figure 14:
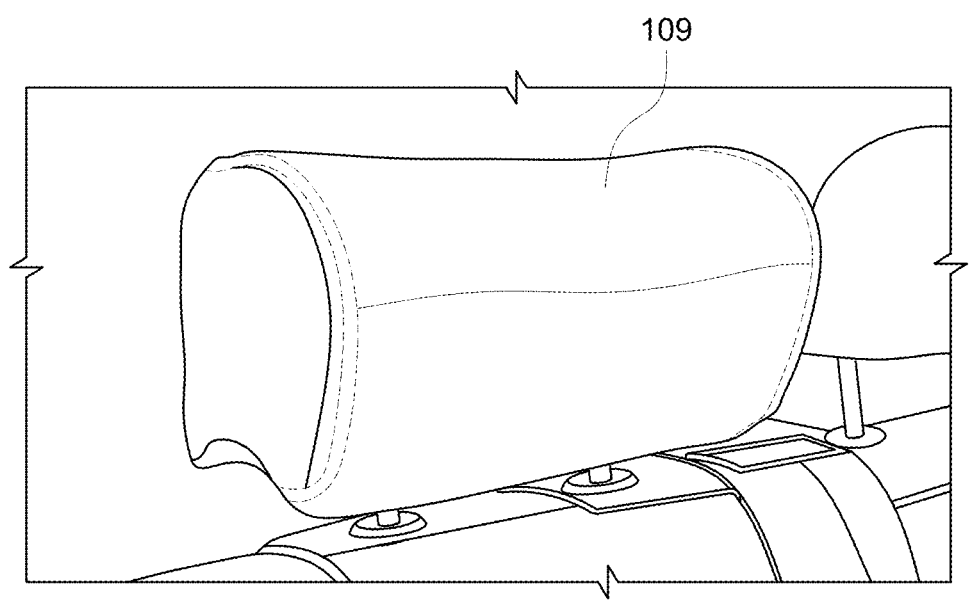
FIG. 14 illustrates an example cover for a headrest projector mount according to embodiments disclosed herein.

FIG. 14 illustrates an example view of a headrest cover 109 which may be used with the illustrated projector headrest mount 100. The headrest cover 109 may be used to hide the projector 101, and in particular, to match the appearance of standard headrests. The headrest cover 109 can be made of cloth. leather, polyester or other suitable materials commonly used as vehicle seat cover material. The headrest cover 109 may be designed to be easily removed and interchangeable, allowing the operator of the vehicle to easily match the interior of the vehicle. In particular embodiments, the headrest cover 109 may be customized based on, for example a particular company (e.g., associated with the projector 101, headrest mount 100, or a content provider).

Figure 15:
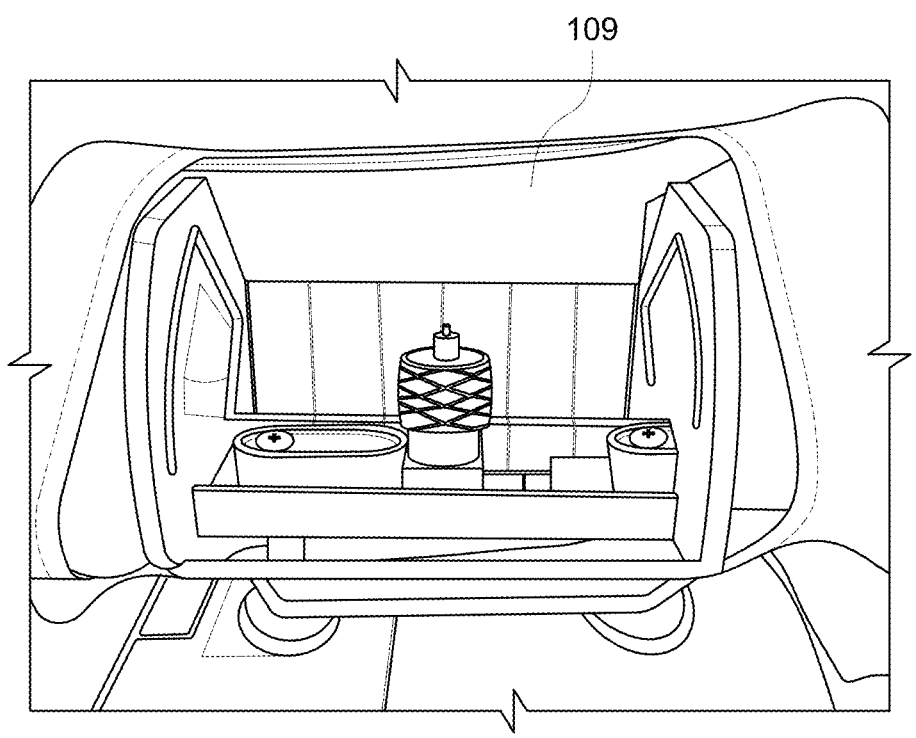
FIG. 15 illustrates an example headrest projector mount in a mounted position according to embodiments disclosed herein.

The headrest cover 109 may be customized based on the owner and/or operator of the vehicle (e.g., in a taxi or rideshare service). The headrest cover 109 may also be offered in seasonal variations for use by the vehicle operator. FIG. 15 illustrates an example rear view of the headrest cover 109. The headrest cover 109 may be open at the back, allowing the projector 101 to easily fit within and project images from the projector headrest mount 100. In particular embodiments, the back of the headrest projector mount 100.

Figure 37A:
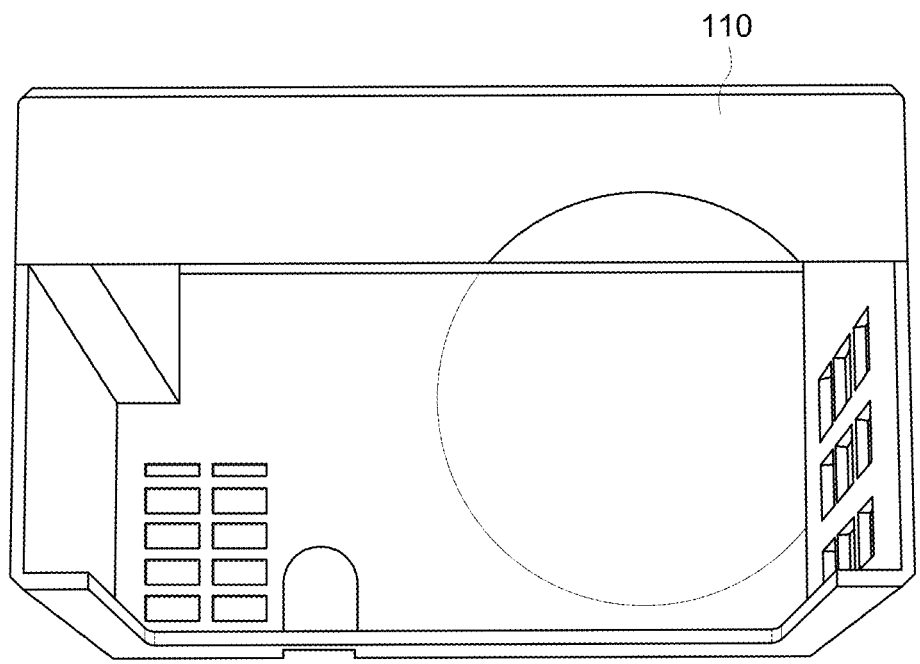
FIGS. 37A-37G illustrate an example projector cover according to embodiments disclosed herein.
Figure 37B:
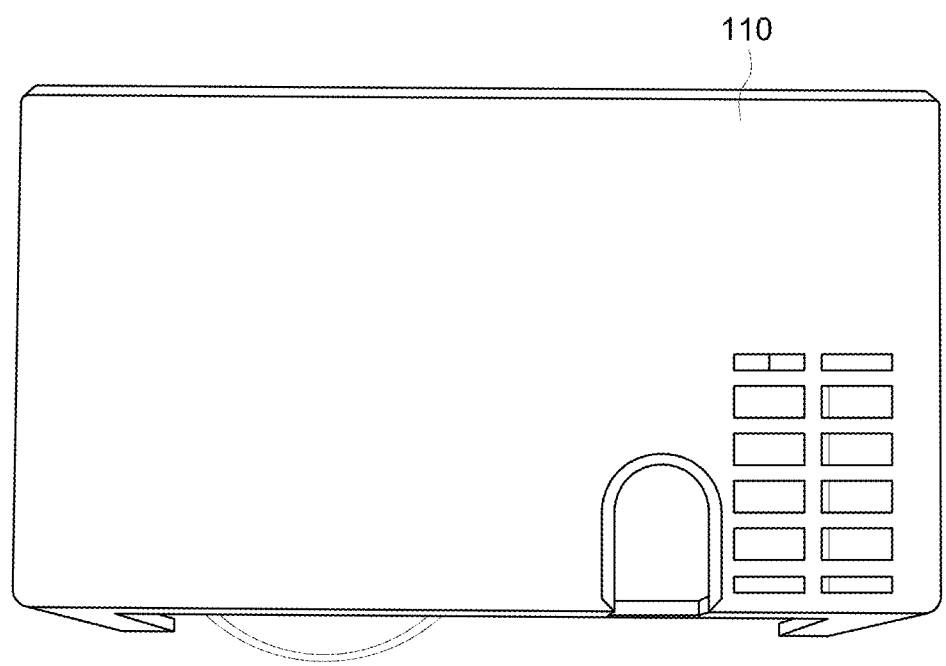
Figure 37C:
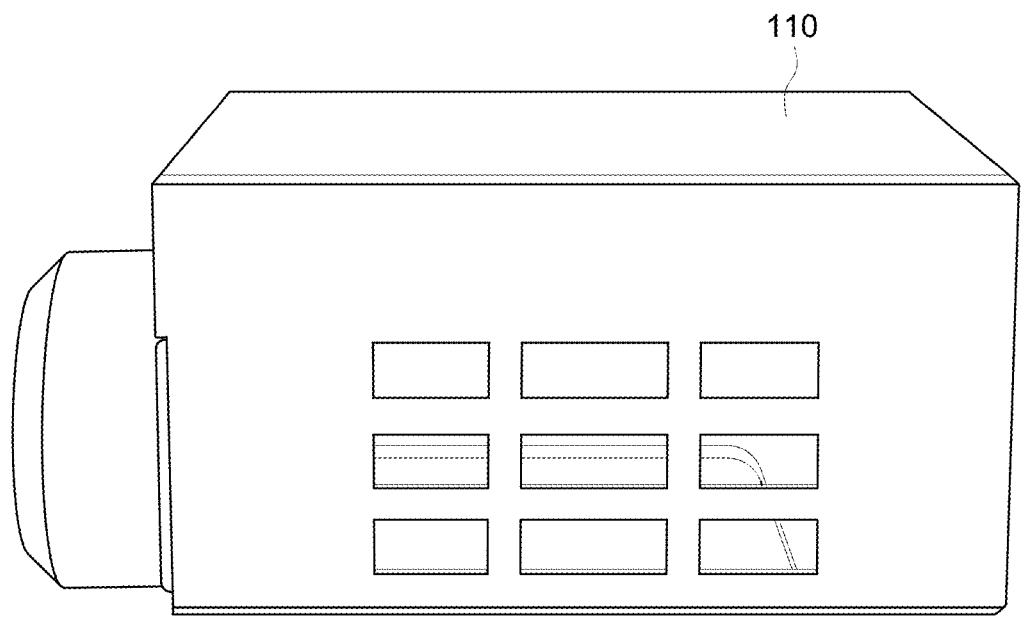
Figure 37D:
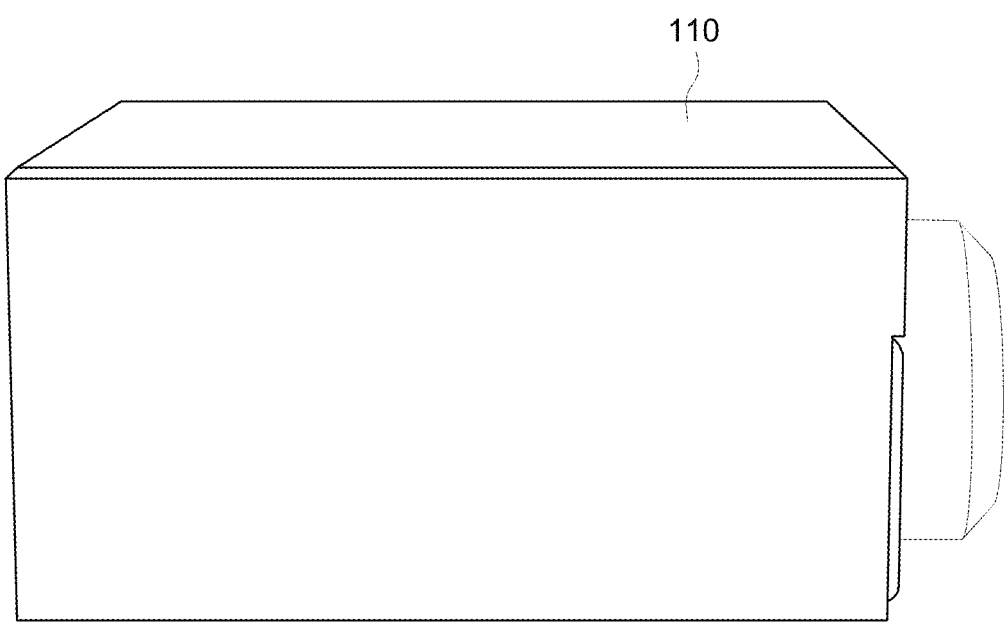
Figure 37E:
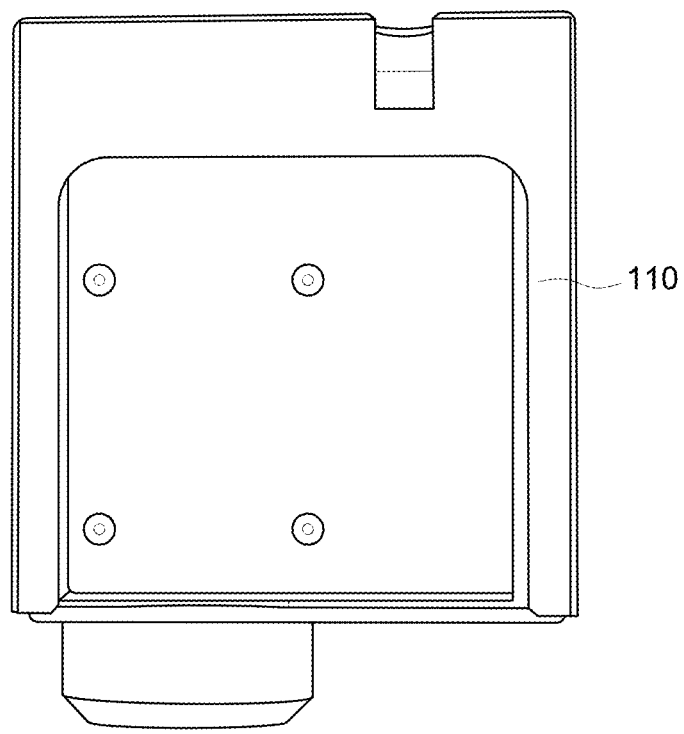
Figure 37F:
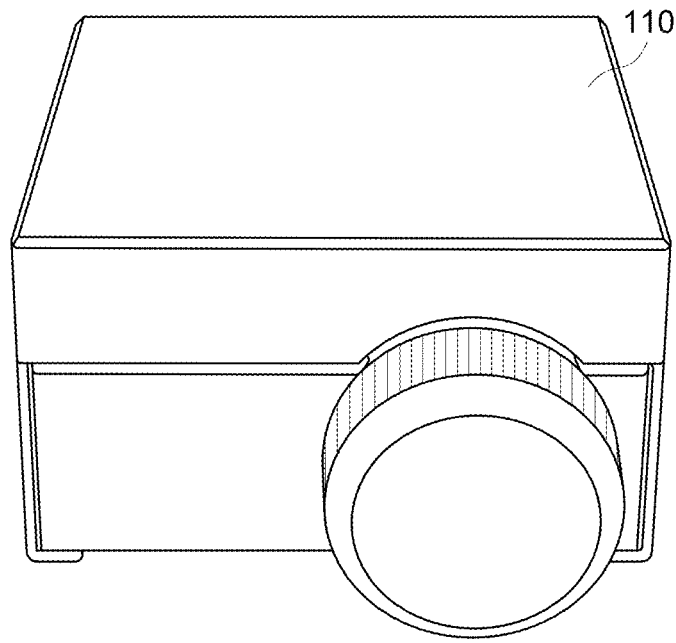
Figure 37G:
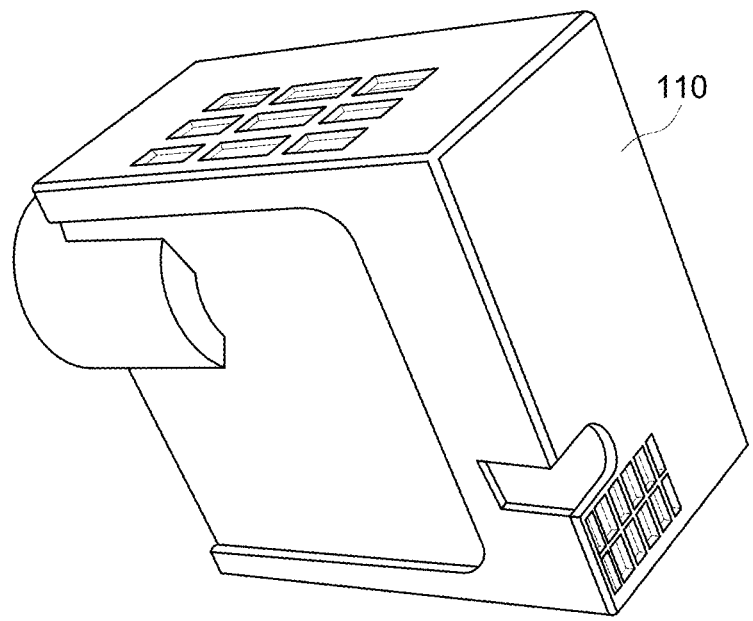

FIGS. 37A-37G illustrate an example projector cover 110 that may be used with a projector mounted using a headrest projector mount 100 according to embodiments disclosed herein. FIG. 37A illustrates a front view of the projector cover 110, showcasing the front mounting space in which the projector sits. A curved region towards the top of the cover leaves space for the projector lens and related components. Along the side and back are vent holes and a larger arched hole for necessary cables. The bottom of the project over is generally open to allow the projector to be mounted according to the embodiments disclosed herein. FIG. 37B illustrates a rear view of the projector cover 110, showcasing the venting holes and arched hole to allow for cables. FIG. 37C shows a first side view of the projector 101, which includes vent holes to align with the vent holes of the projector. FIG. 37D shows a second side view of the projector 101, which does not include vent holes to improve the structural stability of the projector cover. FIG. 37E shows a bottom and interior view of the projector cover 110, including mounting holes to allow the projector cover 110 to be securely mounted to the projector. FIG. 37F shows another front view of the projector cover 110 mounted to an example projector, showing how the projector cover 110 can fit onto the projector 101. FIG. 37G shows a rear perspective view of the projector cover 110 mounted to an example projector 101. Although these embodiments illustrate particular arrangements of the vent holes and other service holes in the projector cover 110, this disclosure envisions other arrangements of vent holes and other service holes as necessitated by the projector 101 to which the cover is mounted. In particular embodiments, the vent holes and other service holes can be configured to align with the venting and other service needs of the project to which the cover is to be mounted. The projector cover 110 can be made of a solid, durable material not prone to overheat, such as an industrial plastic. The project cover 110 can be manufactured using any of a variety of manufacturing techniques, including, but not limited to, injection molding or three-dimensional printing.

Figure 16:
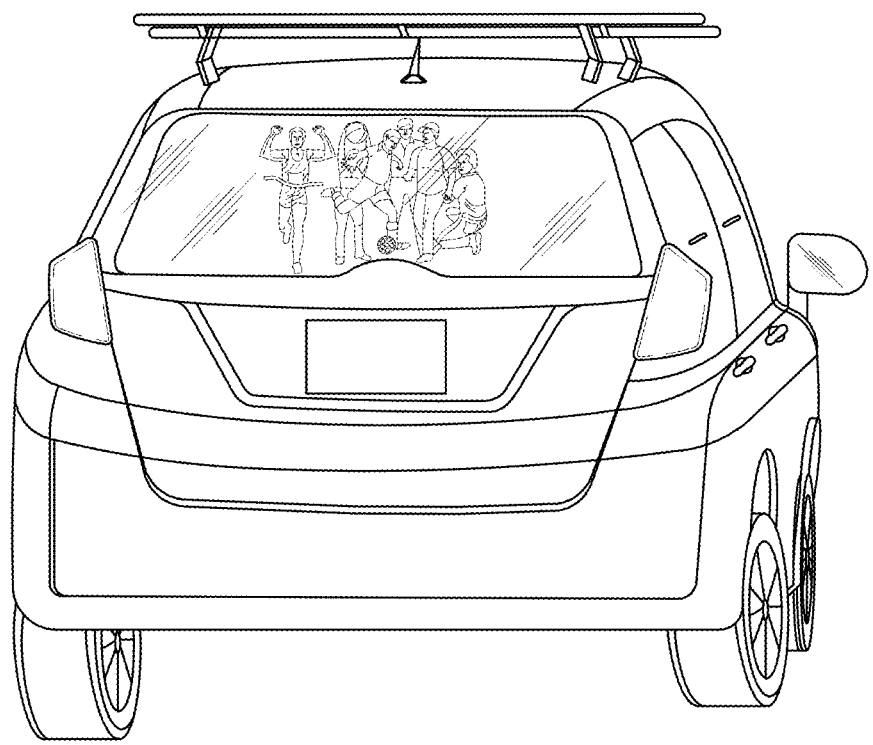
FIG. 16 illustrates an example image projected from a headrest projector mount according to embodiments disclosed herein.

FIG. 16 illustrates an image internally projected on the rear window of a vehicle using a projector mounted using a headrest projector mount 100.

Figure 17:
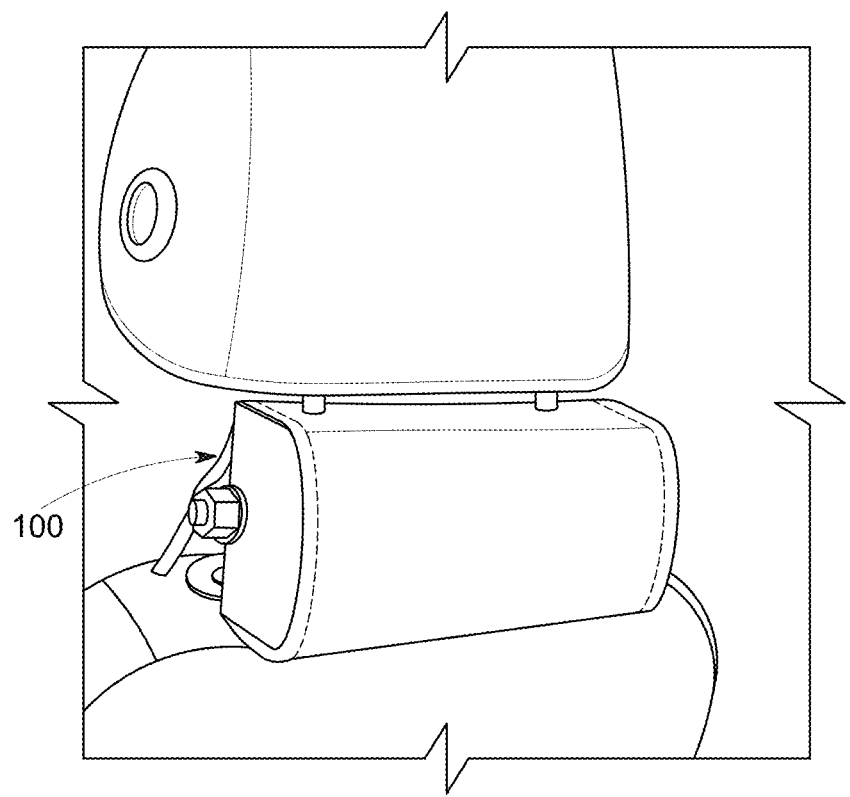
FIG. 17 illustrates an example side-facing headrest projector in a mounted position according to embodiments disclosed herein.
Figure 18:
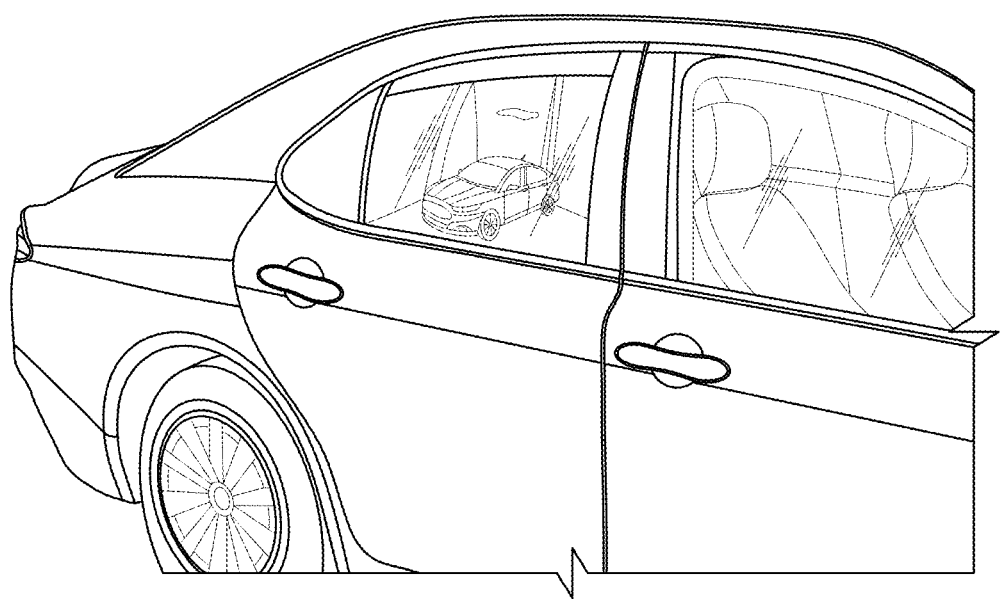
FIG. 18 illustrates an example image projected from a side-facing headrest projector according to embodiments disclosed herein.

FIG. 17 illustrates an example headrest projector mount 100 compatible with a side-facing projector. In this example, the headrest mount 100 is attached to the headrest rails with an aperture of the projector facing one of the side windows (e.g., backseat passenger windows). FIG. 18 illustrates an image internally projected on the side window of a vehicle using a projector mounted using a side-facing headrest projector mount 100.

As described herein, the projector 101 (through the projector mount 100), may be used to provide multimedia content as a form of display for a vehicle-based display system interfacing with the content management system. The projector 101 can cause the rear window of a vehicle to display content. In particular embodiments, the projector 101 can provide for display of high quality media or other content when viewed from a first perspective. When viewed from another perspective, the content may be substantially invisible due, for example, to a coating applied to the glass of the window. In particular, the coating can allow for content to be viewed by persons outside of the vehicle, but may not be visible to persons from inside of the vehicle. Thus, the view of vehicle operators and passengers is not obstructed by the display, as in traditional screens that may be mounted to a vehicle. Multiple vehicle-based displays can be used together, with content synchronized across displays to create a relatively cohesive display.

In particular embodiments, the coating applied to the windows of the vehicle can include a smart film installed on the surface. Additionally or alternatively, the window itself can be replaced with a smart glass window incorporating a coating and controls. The smart film may be capable of being molded or shaped to any size, shape, or form into which glass may be molded. Thus, the use of the smart film allows for nearly any surface to be used as a display in the described content-delivery system. This new display paradigm may enable seamless broadcasting of content, advertising, emergency information, etc. within an environment without requiring a radical redesign of the environment as traditional displays require. In particular embodiments, the smart film may be used in vehicle-mounted displays to allow for a driver, operator, or passenger to change the opacity of a window display on-demand. Thus, an operator may set a display to a smart display setting when a passenger enters a vehicle. The passenger, or the operator at the passenger's request, may increase the transparency of the display so that the passenger may enjoy the scenery around them as the vehicle travels. In some embodiments, the passenger may request that the smart display is turned off while the passenger is in the vehicle.

As described herein, the projector mounts may be used as part of a content management system using vehicle-based displays. The vehicle-based display can involve a video output (e.g., projector), audio output (e.g., built-in speaker, vehicle audio system, wireless speaker), and a content source (e.g., local storage, nearby storage, remote storage, cloud provider), that are coordinate by the user through a mobile application executing on a computing system (e.g., smartphone, laptop, tablet) of the user. FIGS. 19A-19J illustrate example user interfaces that may be provided to enabled functionality of a mobile application provided by a content providing system and/or a control system for controlling a projector for use as described herein. The user interfaces, and their functionality, are provide by way of example and not limitation to illustrate the many features that can be added to the projector and vehicle-based display system described herein.

Figure 26:
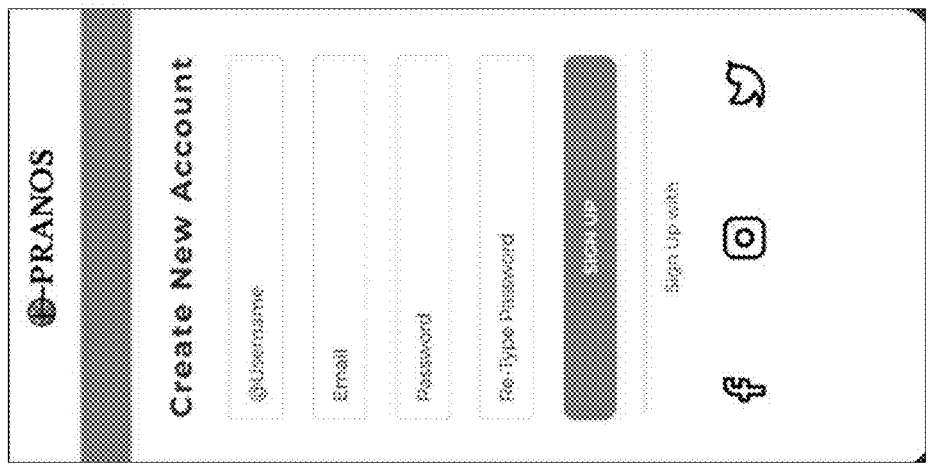
FIG. 26 illustrates an example account creation user interface of a content management application according to embodiments disclosed herein.
Figure 25:
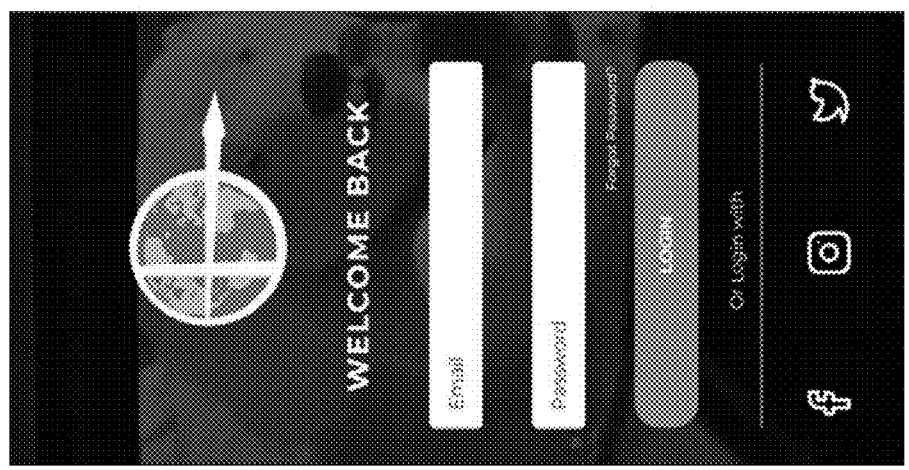
FIG. 25 illustrates an example login user interface of a content management application according to embodiments disclosed herein.
Figure 24:
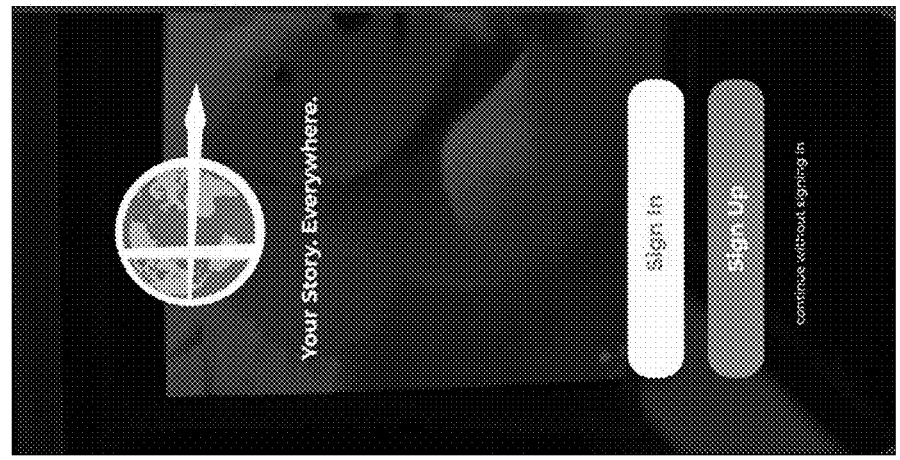
FIG. 24 illustrates an example landing page user interface of a content management application according to embodiments disclosed herein.

FIG. 24 illustrates an example landing page user interface for the mobile application and/or a content management system that may be accessed through the content management system. FIG. 19A illustrates a first example sign in user interface for the mobile application and/or a content management system that may be accessed through the content management system. FIG. 25 illustrates a second example sign in user interface. The user may sign up for an account directly with the content management system account. As an example, FIG. 26 illustrates an example user interface to register for an account. The user may also sign up for the content management system through a third-party platform integration. For example, the content management system may support integration with one or more third-party hosted content distribution services. The user may sign in to the content management system through an account with the third-party hosted content distribution service to automatically enable integration and to easily import and/or support streaming of hosted content from the third party to vehicle-based displays supported by the content management system. Furthermore, the content management system may support integration and sign in through social media integration. Additionally or alternatively, the content management system may use a cloud-based sign in server architecture to facilitate access to the content management system, and logging of user activity, in a geographically-distributed manner. While the user is using the mobile application and/or while the mobile application is causing multimedia content to be delivered via a vehicle-based display, the mobile application may periodically transmit usage data to the content management system.

Figure 19B:
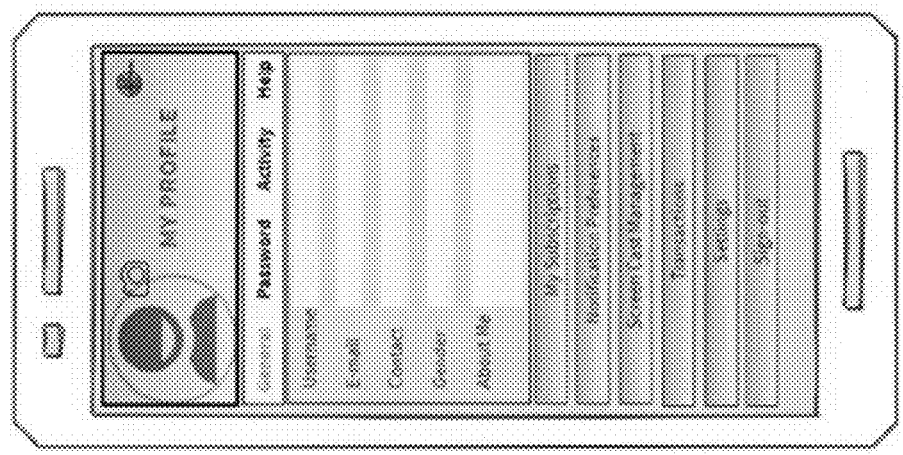
FIGS. 19A-19J illustrate example interfaces of a content management application according to embodiments disclosed herein.
Figure 19A:
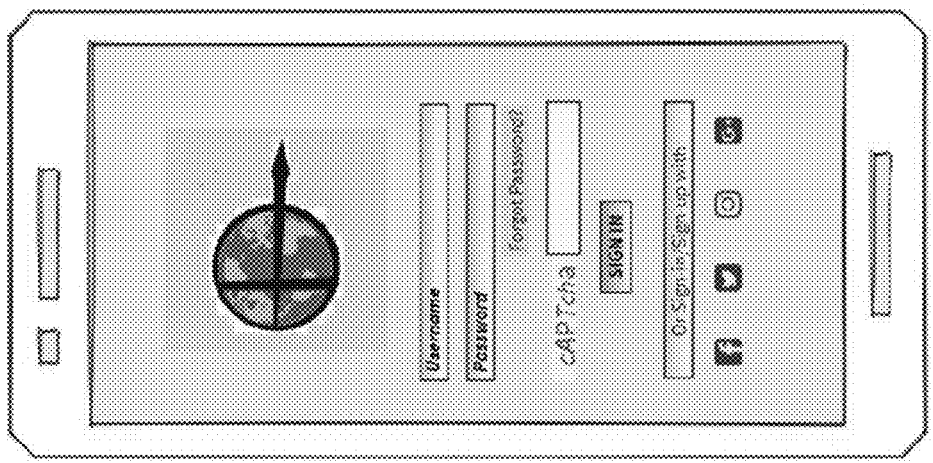
Figure 34:
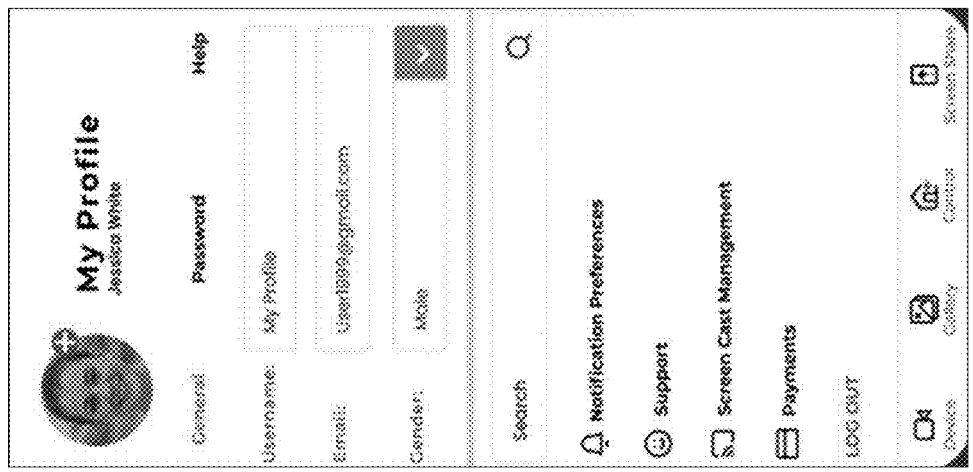
FIG. 34 illustrates an example profile management user interface of a content management application according to embodiments disclosed herein.

FIG. 19B illustrates an example profile management user interface for the mobile application. FIG. 34 illustrates a second example profile management user interface. The profile management user interface may allow the user to modify profile information stored by the content management system and associated with the user (e.g., through a unique user identifier). Logged in and authenticated users may be able to review their profile through this interface and modify aspects of the profile. As an example and not limitation, the user may be able to modify a password, contact information (e.g., email address or phone number), upload and/or modify a profile picture, etc. The user may also be able to management location-based features of the mobile application, such as whether the user will grant permission to the mobile application to access, stored, and use the user's application in order to provide additional features. The user may also be able to determine whether they wish to provide advertisements through their vehicle-based display systems. Doing so may allow the user to generate additional income (e.g., to supplement cost of ownership of the vehicle) as described herein.

In particular embodiments, the user may use the mobile application, or another program interface, to manage aspects of nearby vehicle-based displays. The user my register one or more vehicle-based displays to be associated with their account. As described herein, the vehicle-based display may include WiFi or cellular radio components such that the vehicle-based display can connect to and communicate with one or more remote cloud servers. Then, even when the vehicle based display is not within communication range of the mobile device or a communication session between the vehicle-based display and mobile device is not enabled, the user can manage the vehicle-based display so long as the vehicle-based display is able to communicate with the remote cloud server.

Figure 19D:
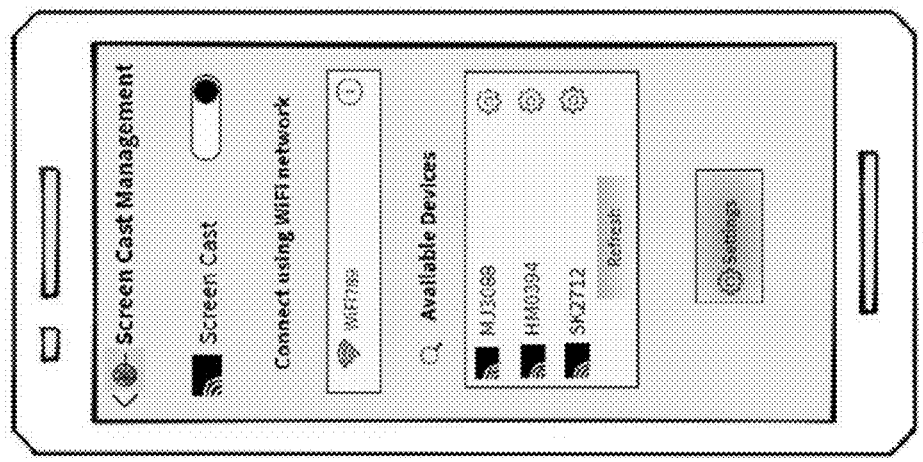
Figure 19C:
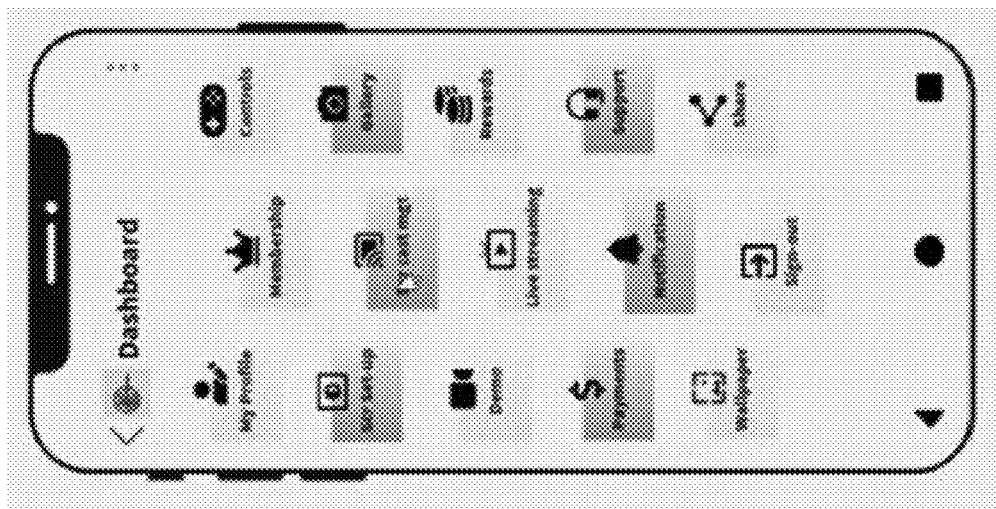

FIG. 19C illustrates a dashboard user interface of the mobile application. The dashboard user interface may provide a centralized hub for the user to access many of the features of the mobile application. The dashboard user interface may include interactive elements to access these features. As an example only, and not limitation, the features provided through the mobile application may include, profile management, membership (e.g., subscription, rewards) management, media playback controls, vehicle-based display setup and connection management, media gallery and search, help pages including product demonstrations and frequently asked questions, payment management, notification management, and many others.

FIG. 19D illustrates a connection management user interface for the mobile application. The connection management user interface (e.g., a screen cast user interface) may be used by an user to identify nearby vehicle-based display systems (e.g., nearby projectors) and connect to the vehicle-based display systems for the purposes of providing content thereon. In particular embodiments, the mobile application may support device discovery through multiple communication protocols. As an example only, the mobile application may use features of the Bluetooth and/or Bluetooth Low Protocol to facilitate device discovery of vehicle-based display systems that are configured according to the protocol (e.g., configured to broadcast advertising beacons when a communication session is not available). As another example only, the mobile application may use a WiFi-based device discovery platform in which vehicle-based display systems regularly issue device discovery beacons and/or respond to device availability polling from the mobile application. In particular embodiments, the mobile application and operational software of the vehicle-based display systems may support the use of the GOOGLE CHROMECAST protocol to support easy streaming of content to the vehicle-based display system as directed by the mobile application. The connection management user interface may be beneficial to facilitate the use of this and other streaming protocols. The user may further use the connection management user interface to facilitate connections between a vehicle-based display system and one or more local audio systems. For example, the user may authenticate the vehicle based display system to connect with a wireless speaker installed in the vehicle, or to connect with the audio system of the vehicle itself, in order to provide audio output as well as image-based output.

Figure 27B:
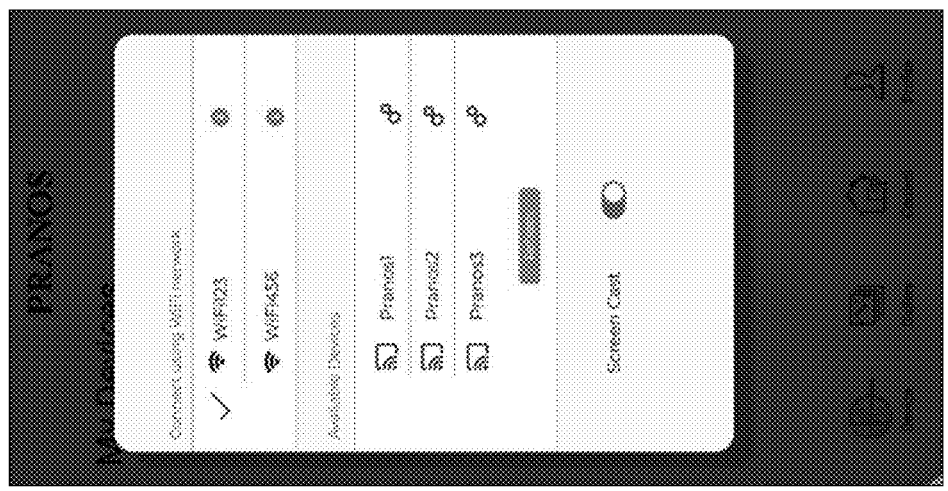
FIGS. 27A-27B illustrate example device management user interface of a content management application according to embodiments disclosed herein.
Figure 27A:
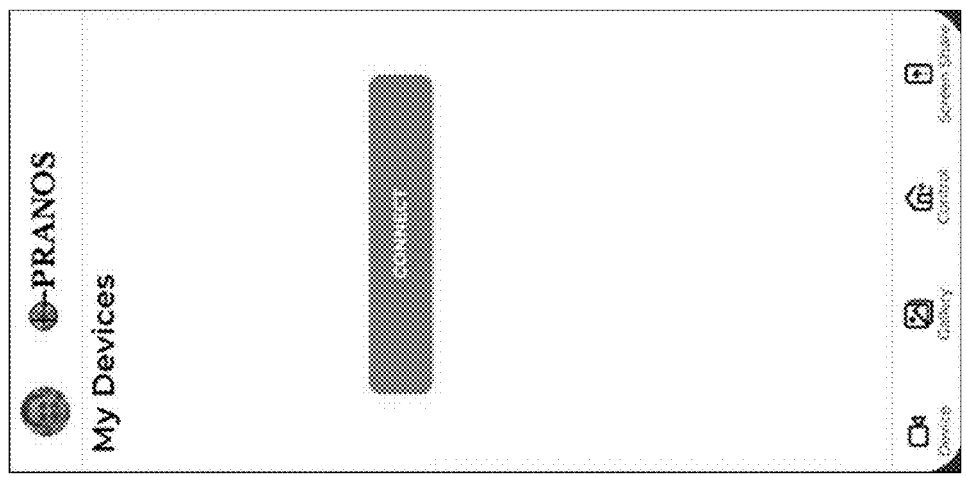

FIGS. 27A and 27B illustrate additional example discovery user interfaces. Through the illustrated user interfaces, the user may interact with the interactive element labeled "connect" in the user interface illustrated in FIG. 27A to prompt the user's mobile device to identify nearby devices that are compatible with the mobile application. The user interface may then update to include, as illustrated in FIG. 27B a modal showing the nearby devices as well as different wireless networks which the user may user to attempt to discovery additional devices. Additionally or alternative, the mobile application may include a dedicated user interface to convey and collect the same information.

Figure 19F:
Figure 19E:
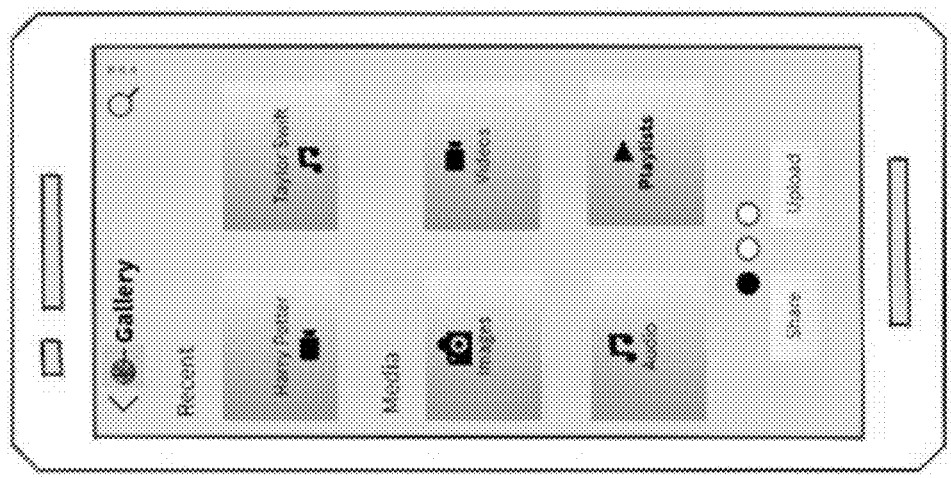
Figure 30:
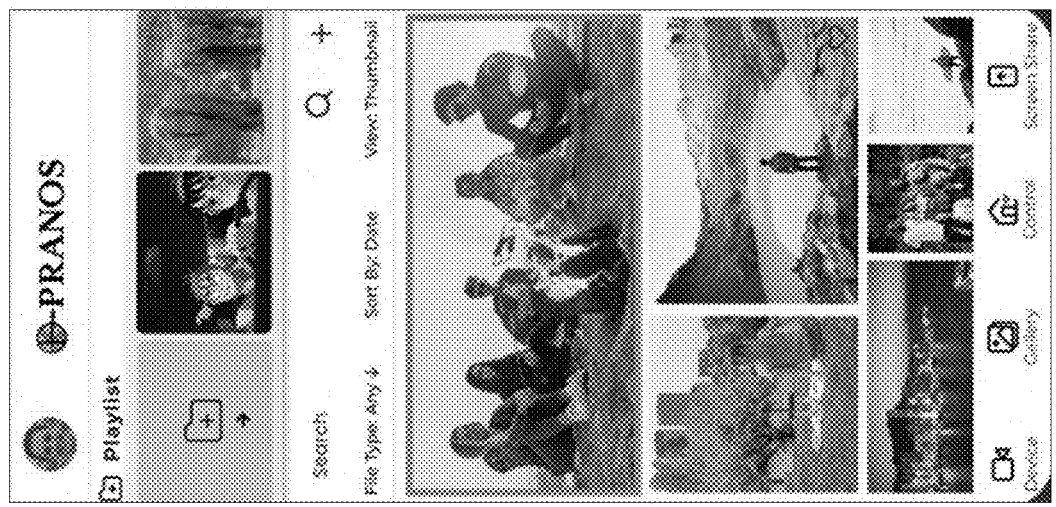
FIG. 30 illustrates an example content gallery user interface of a content management application according to embodiments disclosed herein.
Figure 32B:
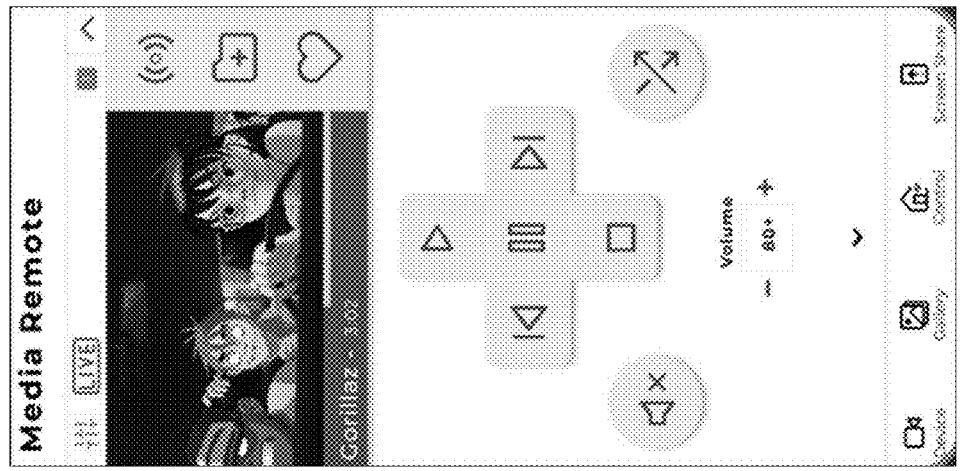
FIGS. 32A-32E illustrate example media remote user interfaces of a content management application according to embodiments disclosed herein.
Figure 32A:
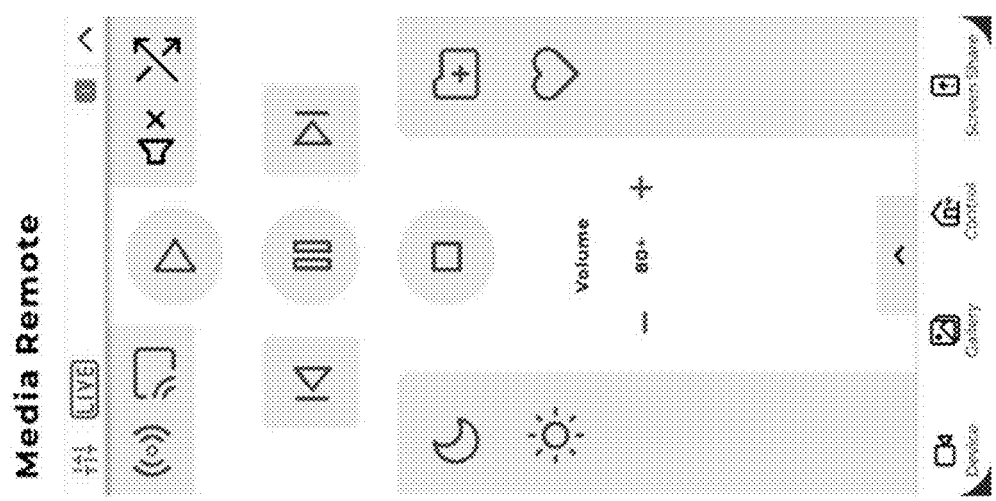
Figure 32E:
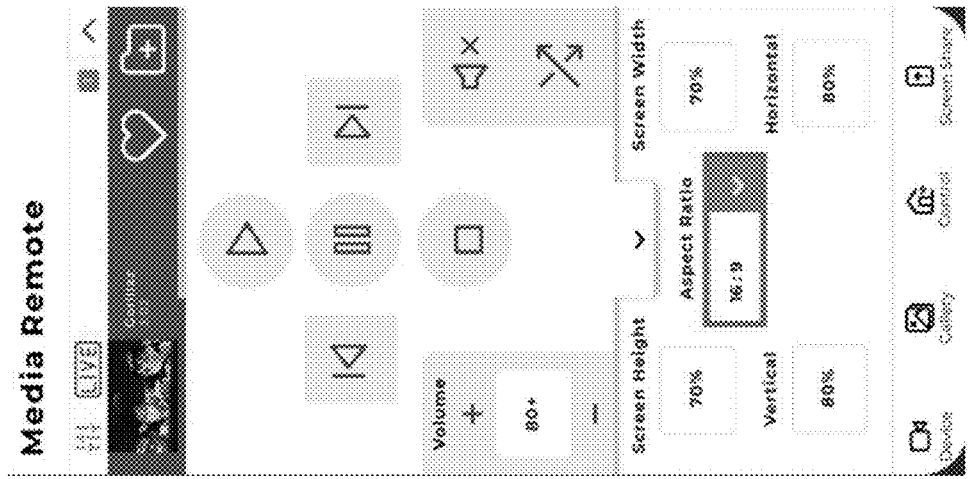
Figure 32D:
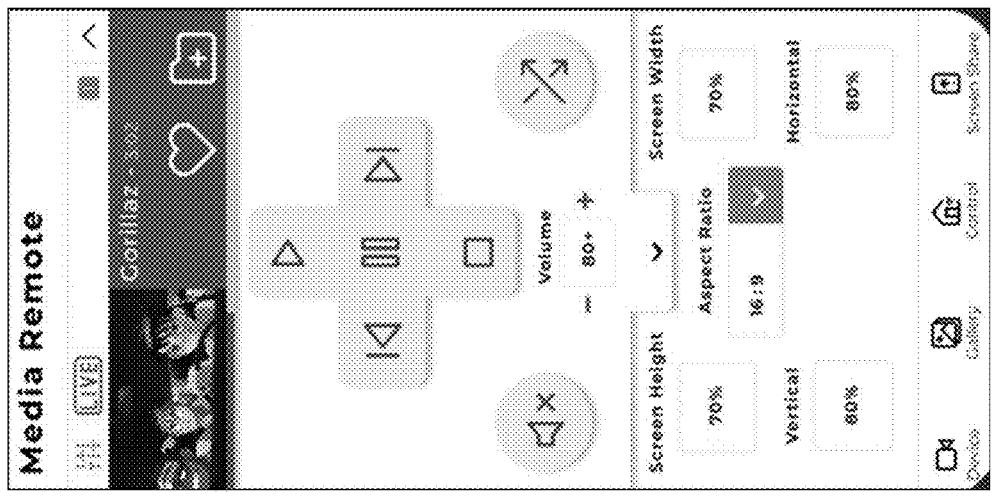
Figure 32C:
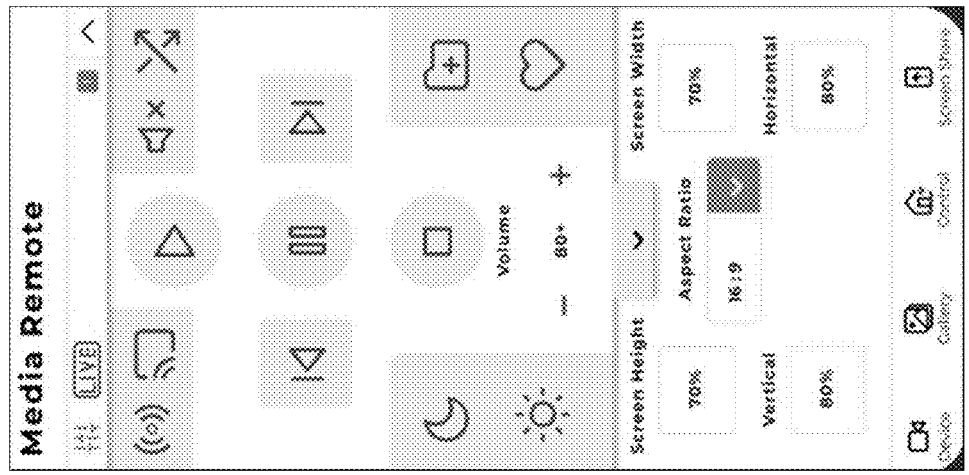
Figure 35C:
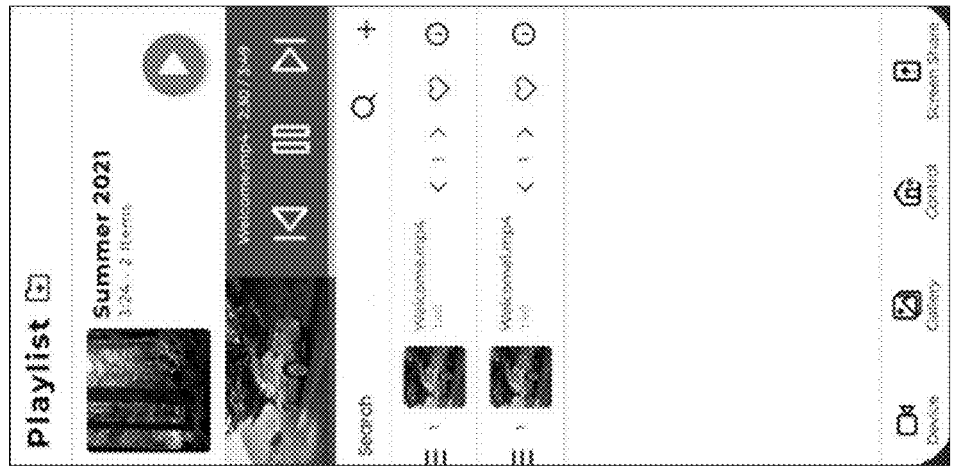
FIGS. 35A-35C illustrates example playlist management user interface of a content management application according to embodiments disclosed herein.
Figure 35B:
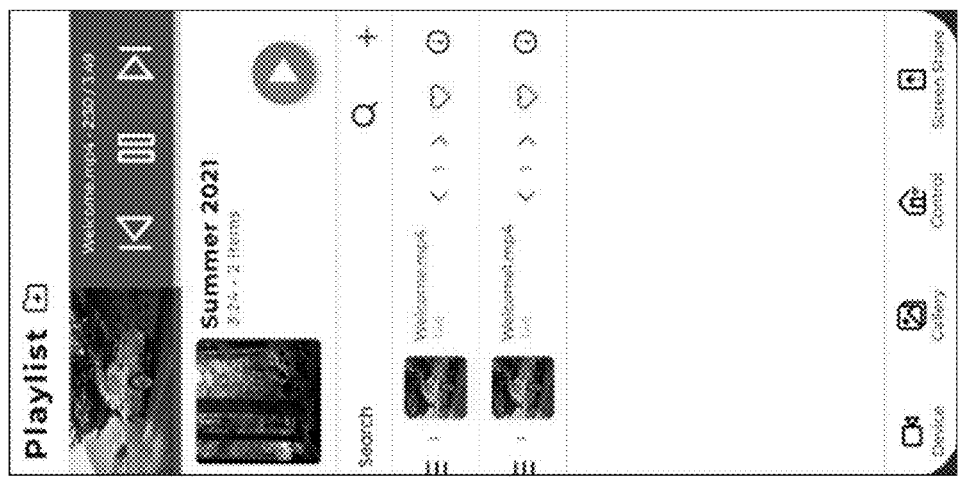
Figure 35A:
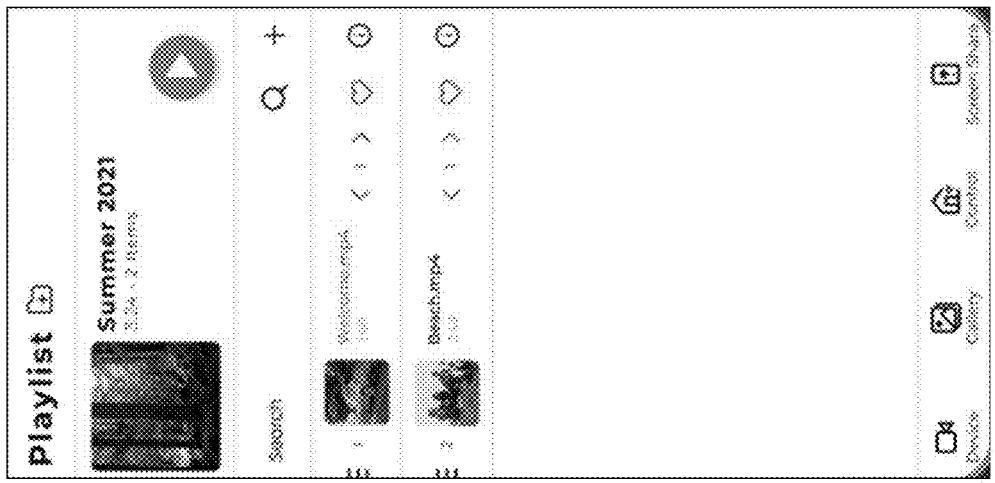

FIG. 19E illustrates an example media gallery interface for the mobile application. FIG. 30 illustrates a second example media gallery for the mobile application. In particular embodiments, the mobile application may facilitate the ability to display locally-stored multimedia content on vehicle-based display systems. The media gallery interface may facilitate the review and discovery of local multimedia content, including content stored on the mobile device, on the vehicle-based display (e.g., on the projector and/or a memory attached to the projector), or on another local content data store. Additionally or alternatively, the media gallery interface may facilitate the review and discovery of remote multimedia content, such as content hosted by a content delivery system managed by the content management system and/or a third-party hosted content delivery service. The content management system may support any suitable multimedia content type and format, including, but not limited to video, music, images, slideshows (which may be controlled through the mobile application and/or automatically), etc. The mobile application may also support the creation of playlists of multimedia content of one or more types. The playlists may be configured to play automatically upon connection of the vehicle-based display to a suitable network (if a network connection is required), upon connection to the mobile application, upon power-up (if the content is available, e.g., through local storage), repeatedly as on a looped basis, and otherwise as configured by the user through the mobile application. Additionally or alternatively, the multimedia on the playlist, the playlist order, or the selection of a playlist may be determine automatically, such as based on time of day, day of week, location of the vehicle-based display system, or based on a nearby crowd size (e.g., as determined through the crowd determination component). FIGS. 35A-35C illustrate example user interfaces for the management and playback of media from and using playlists. FIG. 19F illustrates an example multimedia search interface for the mobile application. Through the search interface, the user may be able to easily discover additional content for display.

Figure 19H:
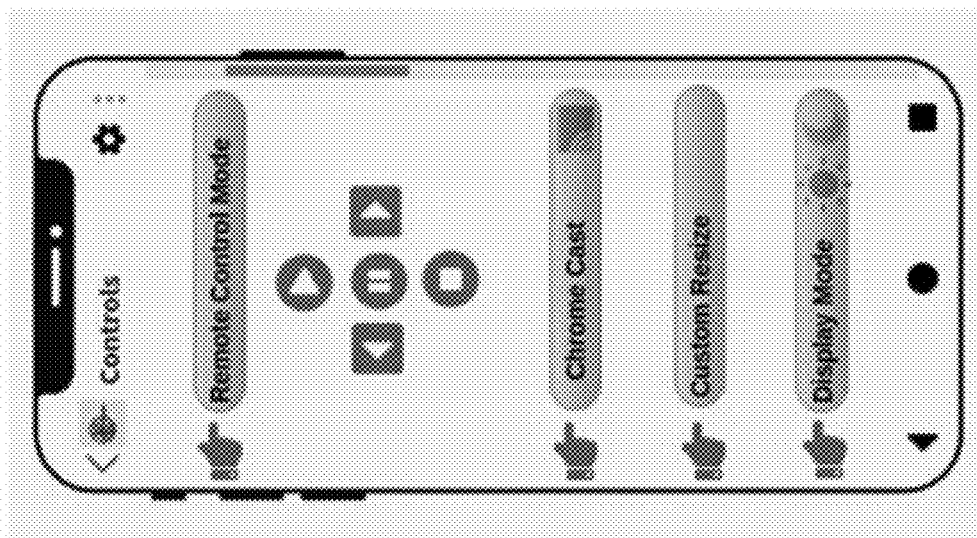
Figure 19G:
Figure 31:
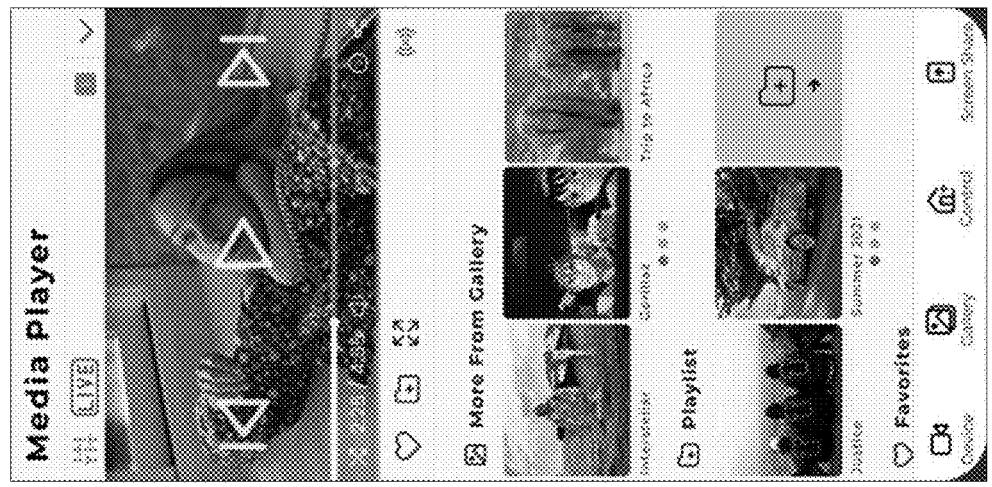
FIG. 31 illustrates an example media player user interface of a content management application according to embodiments disclosed herein.

FIG. 19G illustrates a media player control interface for the mobile application supporting standard and advanced media player control features for content that is being displayed on a vehicle-based display system. FIG. 31 illustrates a second example media player control interface. Features of the media player include the ability to pause, play, stop, rewind, fast forward, and skip media being played. The media control features can further include controls to adjust playback features, such as playback speed, adjust volume levels, adjust video post-processing, resize the video, etc. In particular embodiments, the media control features may intersect with vehicle-based display system configuration settings. For example, the media control features may facilitate the adjustment of display brightness, auto-adjustments based on ambient light (e.g., day mode, night mode, city mode, etc.), and other related effects. The media control features can also facilitate annotation of the media, including marking media as a favorite for expedited future access, adding multimedia to or removing multimedia from playlists, etc.

FIG. 19H illustrates a centralized control interface for the mobile application. In particular, the centralized control interface may include interactive elements to launch configuration procedures, including a procedure to customize the projection window (e.g., size, zoom, skew, etc.) and a procedure to customize display properties of the projection window. Additionally or alternatively, the user may be able to adjust borders for project content and adjust the aspect ratio of the content displayed within, e.g., a projected image. As an example, an image from a vehicle-based display system may be sized to fit neatly with a window of the vehicle. However, the window of the vehicle may not adhere to standard aspect ratios for most forms of content. To display this content, the vehicle-based display system may skew the multimedia content to fit within the confines of the window (e.g., as in a fill-display mode). Additionally or alternatively, the vehicle-based display system may provide for borders around the multimedia content that will fill the image of the vehicle-based display system around the multimedia content. The user can then adjust the aspect ratio and size of the multimedia content agnostic to the precise dimensions of the vehicle window. The user can also adjust the opacity of a smart film-based display. FIGS. 32A-32E illustrate additional example media remote or remote control interfaces. The various media remote interfaces may include additional features, such as volume control, streaming network access and status, screen brightness management, media preference (e.g., favorite, hide, add to playlist, download) management, aspect ratio management (e.g., 16:9, 3:4, 16:10, custom), relative and absolute screen height and width management to customize the aspect ratio, and other related features.

Figure 19J:
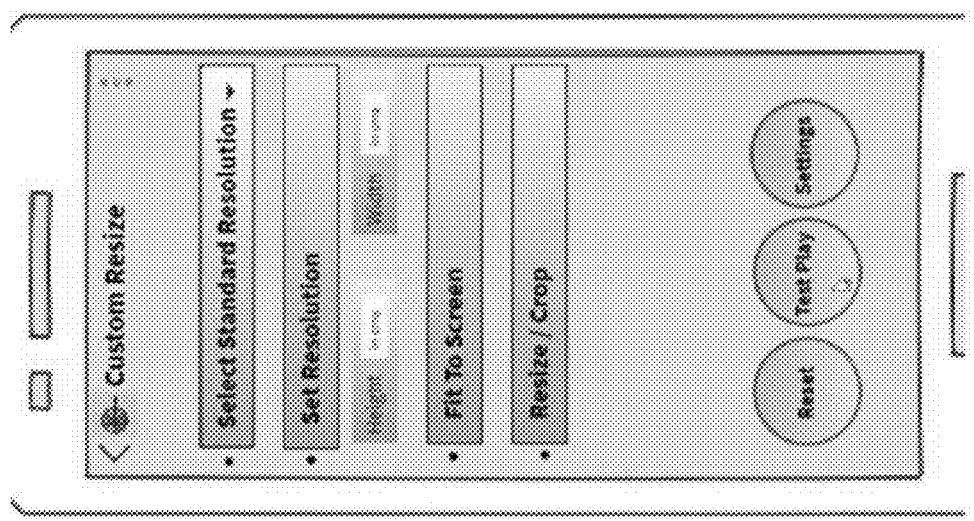
Figure 19I:
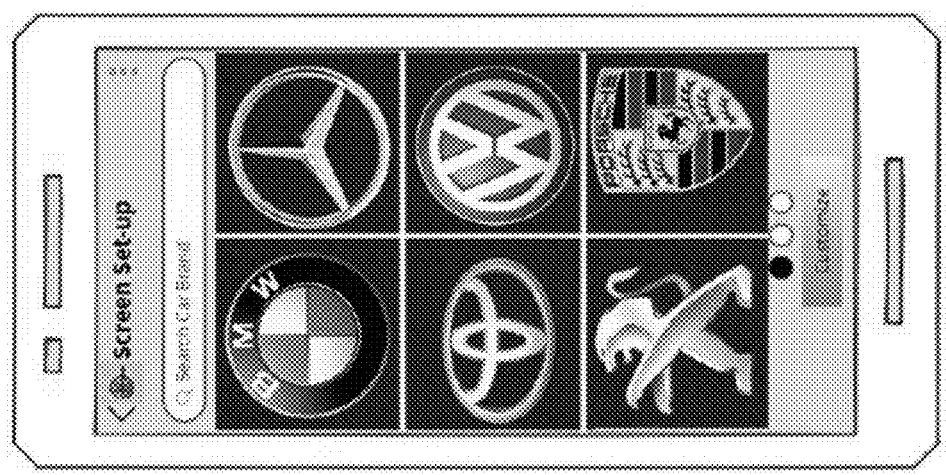

FIG. 19I illustrates a first vehicle-based display configuration user interface. In particular, FIG. 19I illustrates a user interface through which a user may easily configure a projector mounted using the projector headrest mount described herein for use in a vehicle. The user interface shown in FIG. 19I may be referred to as an "out of the box" configuration because the configuration may not require the user to enter precise values during configuration. As an example, a user can install the projector headrest mount and projector. The user can connect to the projector (e.g., through the connection management user interface) and initiate the configuration procedure. The user may search for an identify their make and model of vehicle through the out of the box configuration user interface. The mobile application (e.g., through the content management system) may query a database storing various makes and models of vehicles and identify particular configuration parameters associated with the make and model of the user's vehicle. The configuration parameters may relate to, for example, the zoom, pan, skew, tile, etc. of the projector and may be chosen such that the image from the project will fit with the rear window of the vehicle. The configuration parameters may also adjust the brightness, contrast, hue, saturation, etc. of projected images according to default values, ideal values, user preference etc. In particular, the database of the content management system may store values accounting for typical levels of tint applied by manufacturers to the targeted windows. The configuration process may adjust the image appearance parameters of the projector accordingly.

Figure 33:
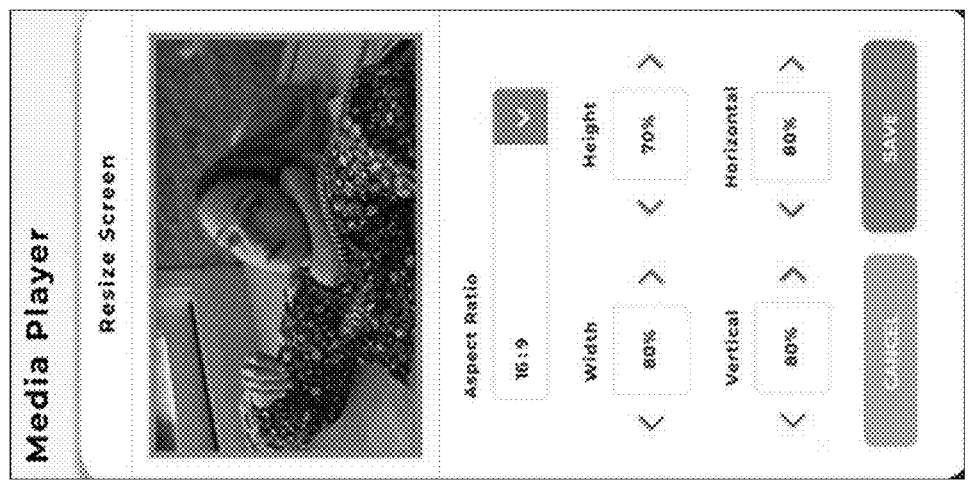
FIG. 33 illustrates an example screen management user interface of a content management application according to embodiments disclosed herein.

FIG. 19J illustrates a second vehicle-based display configuration user interface. In particular, FIG. 19J illustrates an example custom resize interface of the mobile application. FIG. 33 illustrates a second example custom resize interface of the mobile application. In particular embodiments, the out of the box configuration may be sufficient for the vehicle-based display system to adequately display multimedia content. However, the user may desire to further customize the display, the user may have a vehicle for which appropriate display configurations are not currently known, or may have made after-market modifications that would affect the display configurations. The mobile application therefore can allow the user to make detailed modifications to the display characteristics of the vehicle-based display. The customizations can be used temporarily (e.g., only for the current session) or can be saved to the mobile device or a cloud server for recollection by the vehicle-based display system for future use. As an example, the custom resize interface may be shown as a modal that appears through the user interface in response to a user engaging an interactive user interface element specifically relating to the media playback aspect ratio. The user may interact with the various elements to stepwise adjust dimensions of the aspect ratio, may enter text corresponding to a desired value in an appropriate interface element, and/or may select a preset or saved aspect ratio configuration.

Figure 28C:
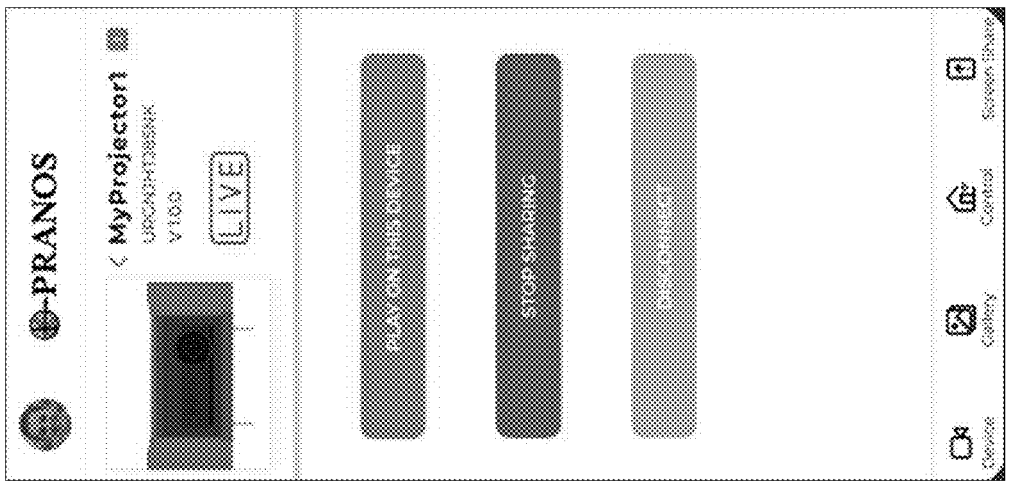
FIGS. 28A-28C illustrate example device management and selection user interfaces of a content management application according to embodiments disclosed herein.
Figure 28B:
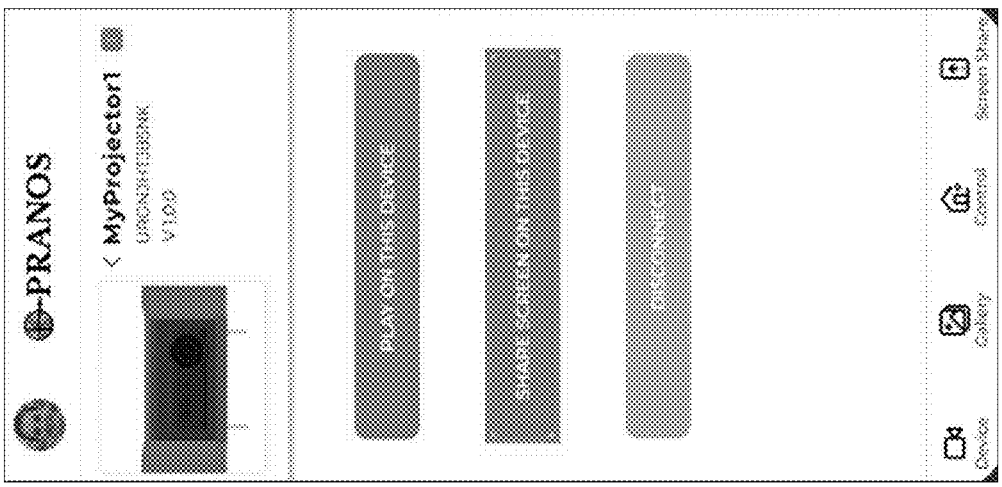
Figure 28A:
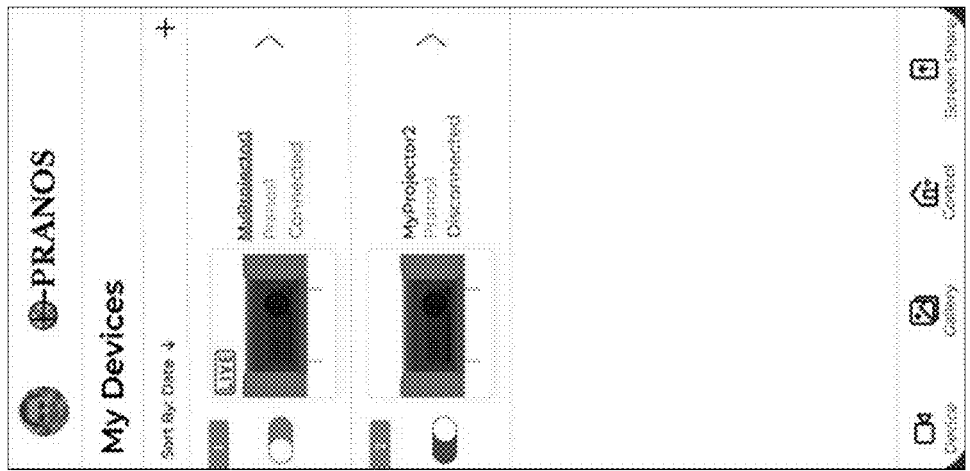
Figure 29C:
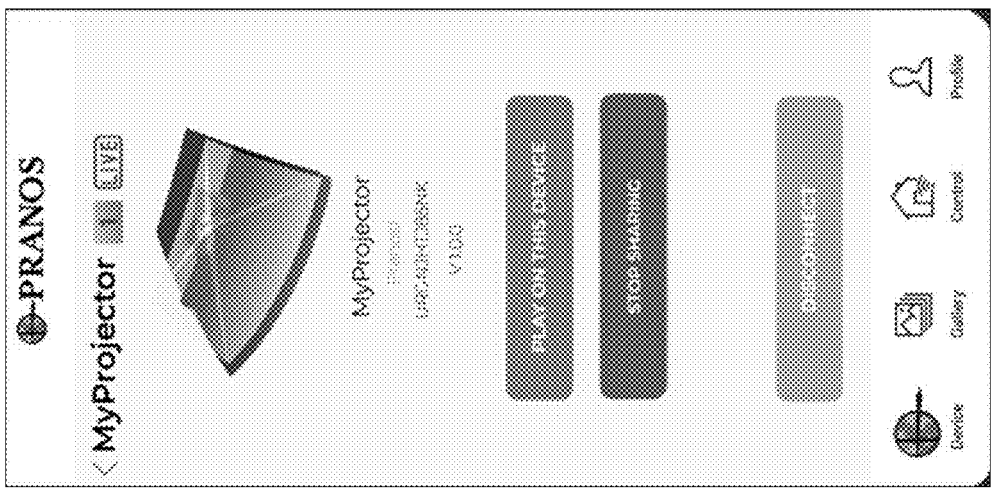
FIGS. 29A-29C illustrate example device management and selection user interfaces of a content management application according to embodiments disclosed herein.
Figure 29B:
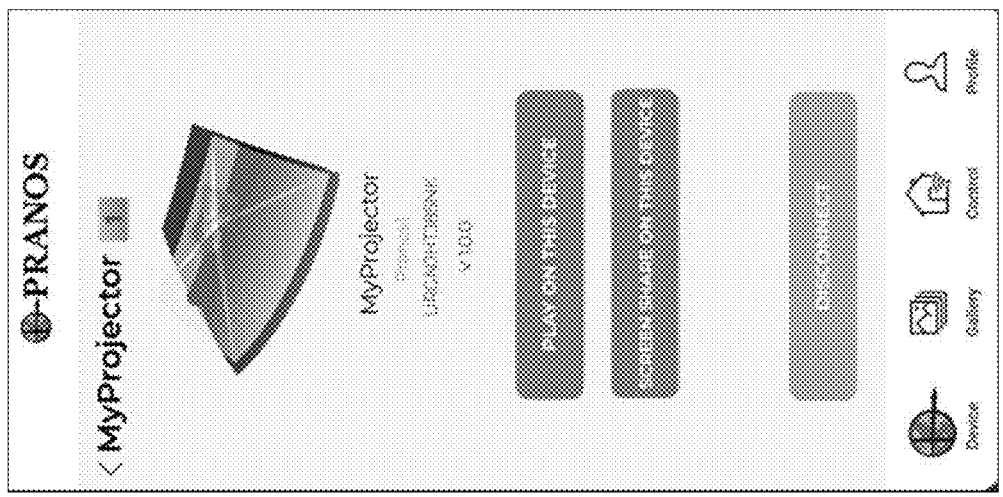
Figure 29A:
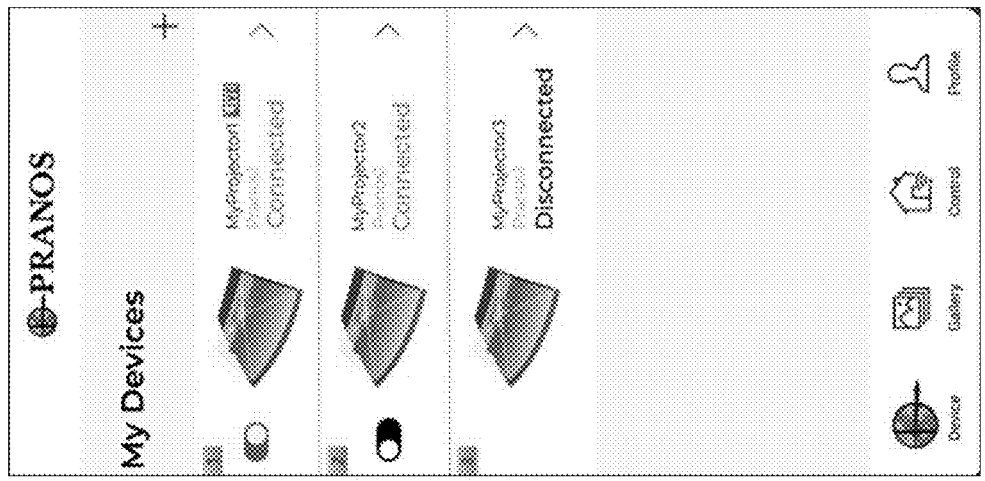

FIGS. 28A-28C and FIGS. 29A-29C illustrate example interfaces of the mobile application relating to the selection of particular display devices to which to display content. FIGS. 28A-28C correspond to the selection of a headset-mounted projector display and FIGS. 29A-29C correspond to the selection of a rear-shelf projector display. In FIGS. 28A and 29A, the user is presented and can select from a number of interface elements that each correspond to an available display. The interfaces include identifying information for the displays as well as information about the status of the displays. FIGS. 28B and 29B show a detailed view of a particular display, such as after a user has selected the display in the preceding interface. FIGS. 28B and 29B include additional interface elements through which a user can select whether, for example, to use the display to play particular content or to share their device screen. FIGS. 28C and 29C illustrate the user interface after the user has elected to start playing content or share their device screen through the display. The interface elements update to indicate, for example, that the device is "live" and to provide elements through which a user can stop playback or sharing.

Figure 36A:
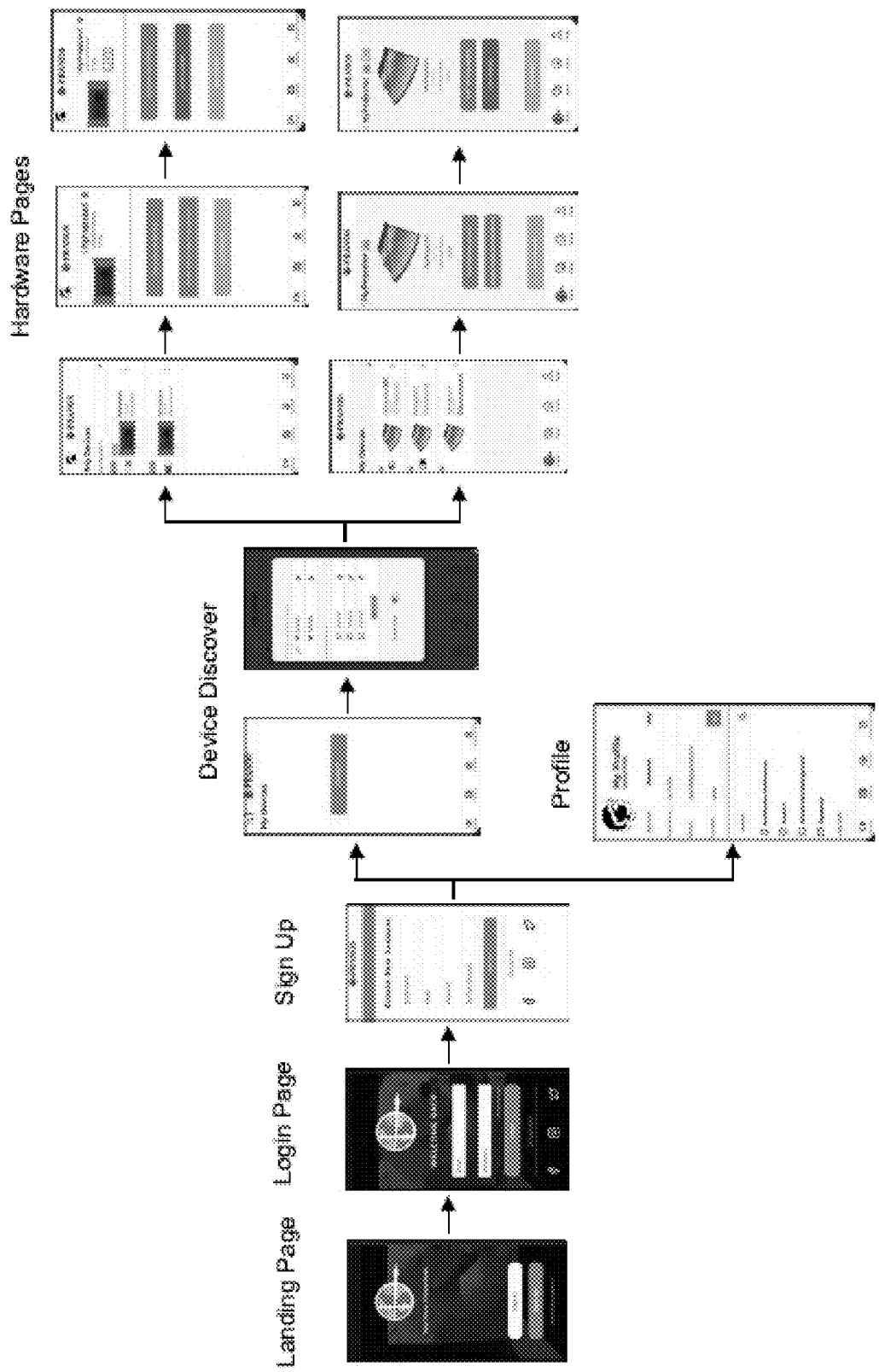
FIGS. 36A-36B illustrate example user interaction flows of a content management application according to embodiments disclosed herein
Figure 36B:
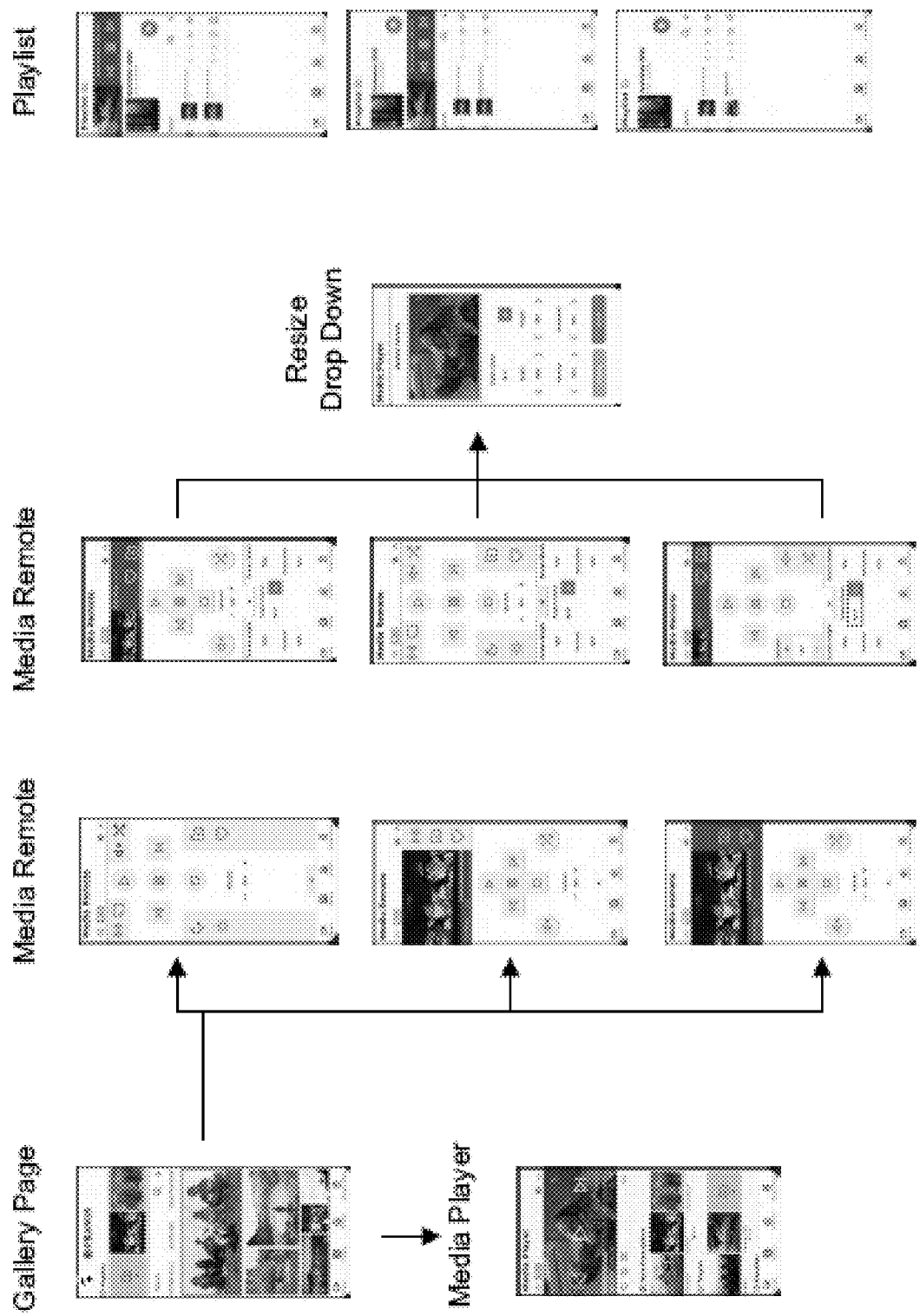

FIGS. 36A-36B illustrate example user interaction flows of several of the user interfaces of the mobile application described herein. The user interaction flows illustrates are examples only and are not intended to be limiting. To that end, additional interfaces and interactions can be added and certain interfaces can be skipped according to particular embodiments. As shown in FIG. 36A, the user can proceed from the landing page to the login page and/or sign up page if needed. The user can then manage their profile or discover and manage nearby displays. This device management can include select which displays to which to display content in the so-called hardware pages. Continuing on to FIG. 36B, the user can select media through the gallery page and use the media player and/or media remote user interfaces to manage aspects of playback. If the media remote (or other interface) includes the ability to manage the aspect ratio of the display window on the remote display (e.g., the projector aspect ratio), the aspect ratio modal can be display. Additionally, the user can interact with various playlist managing interfaces.

Although this disclosure describes particular features of the mobile application being attributed to or usable through particular user interface, this is by way of example only and not limitation. The mobile application may feature grouping of mobile application features based on, for example, user need and/or preference and feature groupings are not limited to being within a particular user interface.

Figure 20:
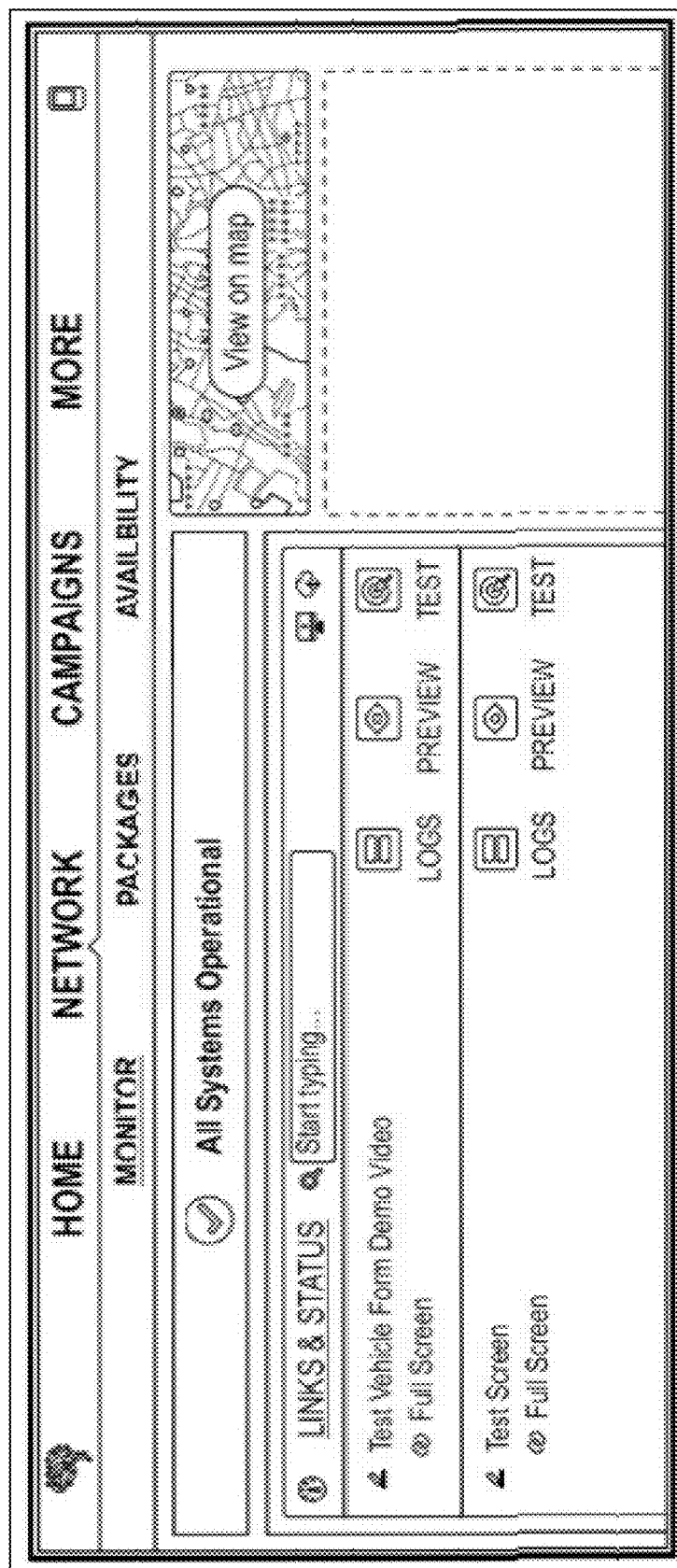
FIG. 20 illustrates an example content management user interface.

FIG. 20 illustrates an example user interface which a user of the mobile content delivery system may use to control multimedia to be provided on particular vehicle-based displays. The user interface may be made available to users who have installed the vehicle-based displays on their vehicles. In particular, the user interface may be made available to users who wish to pay to specify content that is provided to certain users or groups of users. Depending on the user's purposes, the user may be encouraged to upload their own content or select and modify content provided by the content server. In particular embodiments, and described further below, the content server may track the location of vehicles into which the vehicle-based displays are installed, including through communication with mobile devices within communication range of a vehicle-based display of the vehicle, from the vehicle-based display itself, or as reported by the vehicle. This may be used to facilitate an more targeted approach to selecting where and to whom content is provided. In particular embodiments, the provision of content through the centralized content server on the basis of geographical location information may be known as geo targeting.

In particular embodiments, non-vehicle operator customer may desire for particular content to be displayed on the vehicles. For example, a broadcast partner may wish for particular content to be delivered at a particular area through the targeted content delivery service. As another example, a commercial advertiser may seek to run an advertising campaign using the vehicle based displays through the targeted content delivery service. The commercial advertiser may select a desired number of vehicles to display its content, an amount of time that each vehicle shown display the content, a duration of the campaign, a targeted location of the campaign (e.g., geo targeting, as described below), the type of vehicle-based display on which the content should be displayed (e.g., in the case that rear-window displays are more expensive than side-window displays), and other suitable parameters for the campaign. As another example, public (e.g., government) actor or contractor may seek to use the network of vehicle-based displays to convey important information to the public. The public actor may be provided special privileges to preempt content selected by other users depending on the necessity of the case. For example, in the case of a missing person, the public actor may require some or all vehicles near the believed location of the missing person to display information about the missing person and how to contact the proper authorities. Similarly, if a severe weather event is expected, such as a flash flood, the public actor may require vehicle-based displays for vehicle traveling into the affected area to display warning information. As another example, vehicles in and around a construction shown may be required to display warnings relating to the construction.

In particular embodiments, a vehicle operator may desire to allow for content to be shown on their vehicle's displays. The vehicle operator may be awarded compensation in the form of a passive income in exchange for the display such that the vehicle acts as a moving billboard on which the vehicle operator rents out space. The vehicle operator may use a user interface such as the dashboard shown in FIG. 20 or one or more of the mobile application user interfaces of FIGS. 19A-19J to control when and where third-party content may be displayed on their vehicle. For example, a vehicle operator may desire that the displays of their vehicle are turned off when the user is at or near their home. A vehicle operator may desire that the displays of their vehicle are turned off if the vehicle operator is driving during particular hours of the day. In another example, a vehicle operator may desire to opt out of allowing commercial advertisers or broadcasters to show content using their vehicle-based displays, instead using it as a personal display device.

The content server may receive locations of some or all vehicles onto which the vehicle-based displays have been installed. For example, the vehicles and/or vehicle-based displays may each be equipped with a GPS transceiver that is in communication with a centralized content server through one or more controllers on the vehicle or display. The content server may track the received locations of vehicles to determine movement patterns (e.g., a driver's route), select particular content to show based on preferences of a commercial advertiser, broadcast partner, or vehicle operator, track approximate content impressions, determine a cost or appropriateness of showing particular content, and otherwise control content provision and content campaigns. Content impression may be measured based on approximate vehicle and foot traffic near each vehicle, for example through a crowd determination component of the vehicle-based display. Content impression may also be measured based on a data exchange with, for example, a phone provider, provider of location-based services, or other data broker.

The location of vehicles may be compared to known points of interest on a map prior content being delivered. For example, an advertiser or broadcaster may target a college-aged demographic and the content server may push content to vehicles driving near college campuses. Similarly, an advertiser or broadcast partner may wish to avoid advertising or providing specific content to children, so the content server may bar particular content from being shown on vehicles driving near schools.

The current time and the location of vehicle relative to particular public events may be determined prior to content being delivered. For example, an advertiser may wish to capitalize on a predicted influx of traffic from people going to attend a concert. As another example, a restaurant may desire to show a first set of advertisements during a particular time to coincide with a time where discounted food is available and show a second set of advertisements during other times.

Figure 21A:
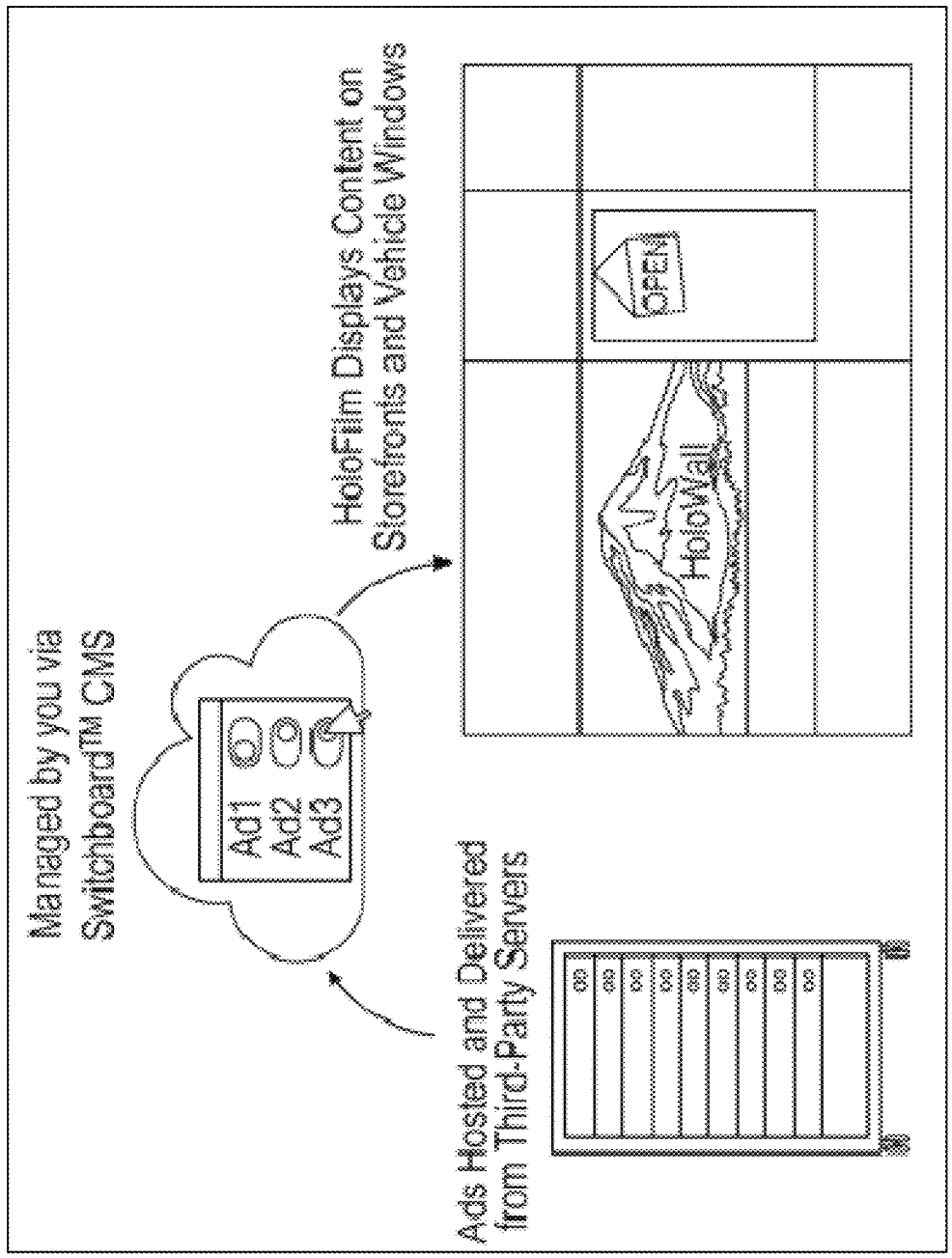
FIGS. 21A-21B illustrate example system architecture diagrams of the content delivery service.
Figure 21B:
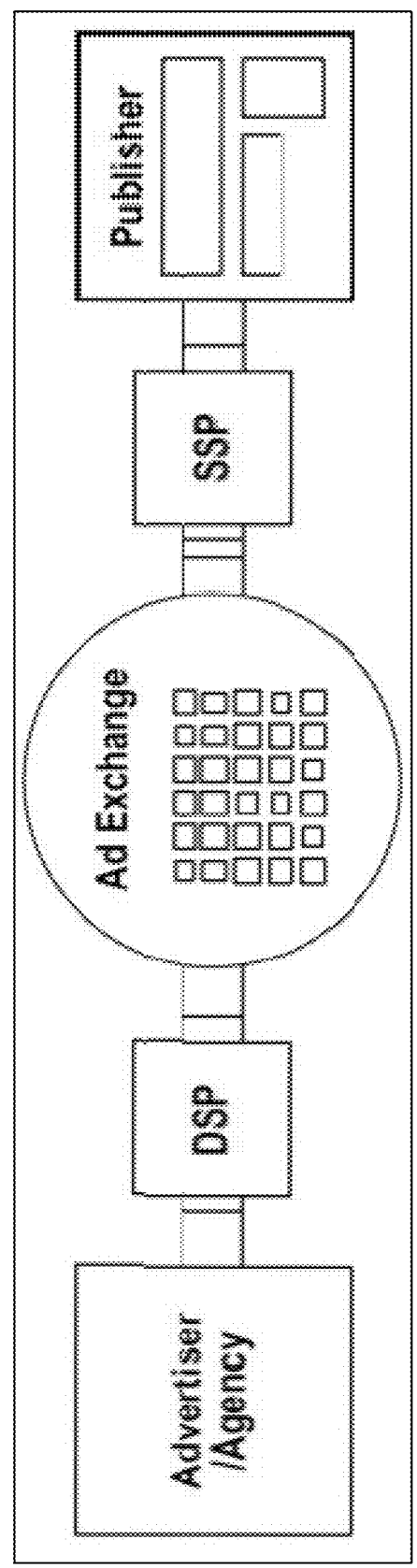

FIGS. 21A-21B illustrate an example system architecture diagram of the content management system. Content may be broadcast live from the demand side platform and directly to the supply side platform on the described content management system. The system may be divided into content slots that displays pre-programmed content such as news, music/movie releases, sports and other information. The slots that are reserved for ad space that are not reserved can be sold by a publisher advertising server. The ad slot is then sent to the supply side platform (third party entity) which helps the publisher (e.g. displays) to sell its unsold inventory in a real time programmatic bidding system. The offer then goes on to the ad exchange and sells to demand side platforms and ad networks. The ad exchange then starts asking for bids and then the exchange selects the winning bid. This all can happen in under 10 milliseconds. Real time bidding allows for the right ad to be displayed based on the demographic of the consumer, such as age, sex, shopping habits and interest, to better cater to their particular needs.

Figure 22A:
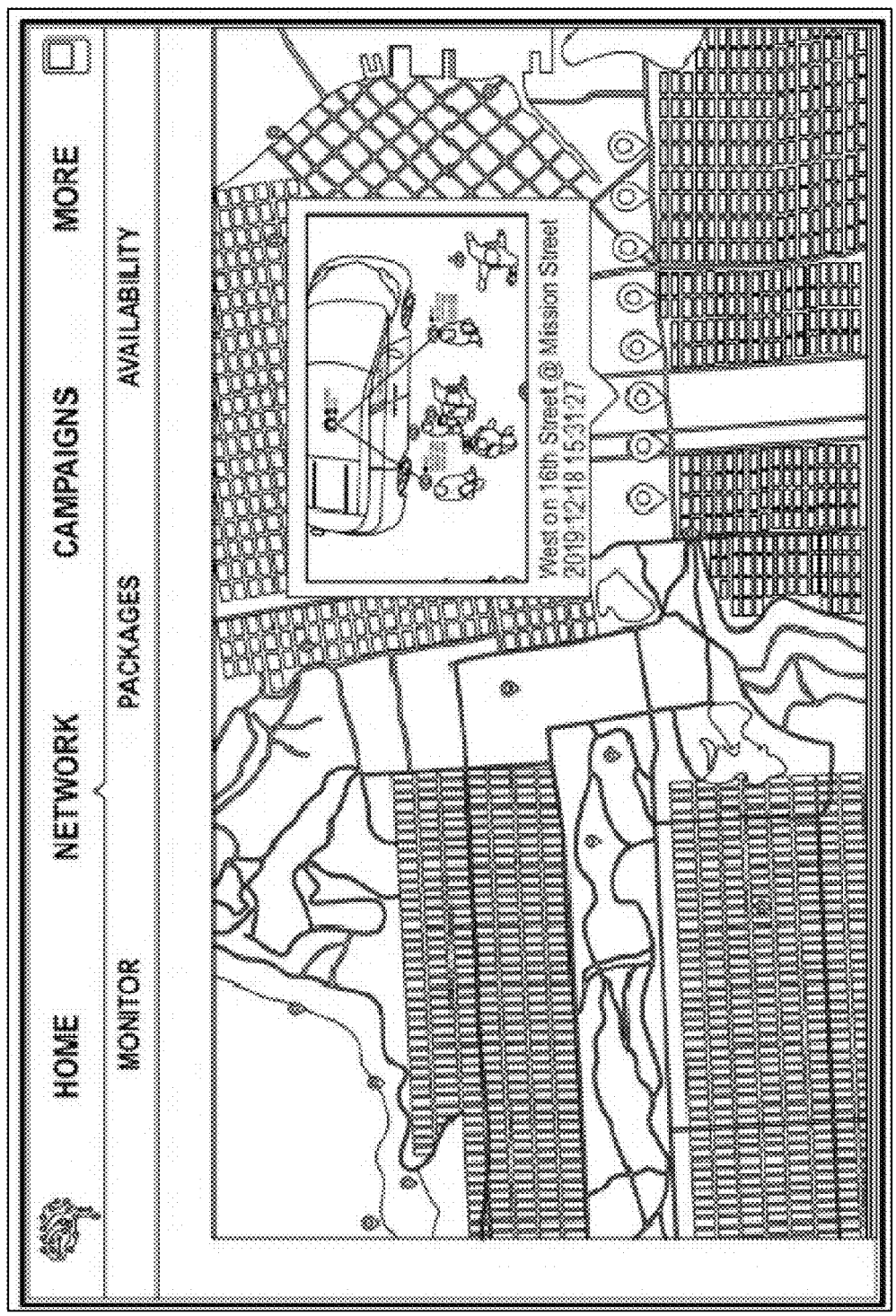
FIGS. 22A-22B illustrate aspects of real-time attribution of content consumption or interaction by pedestrians or other content consumers.
Figure 22B:
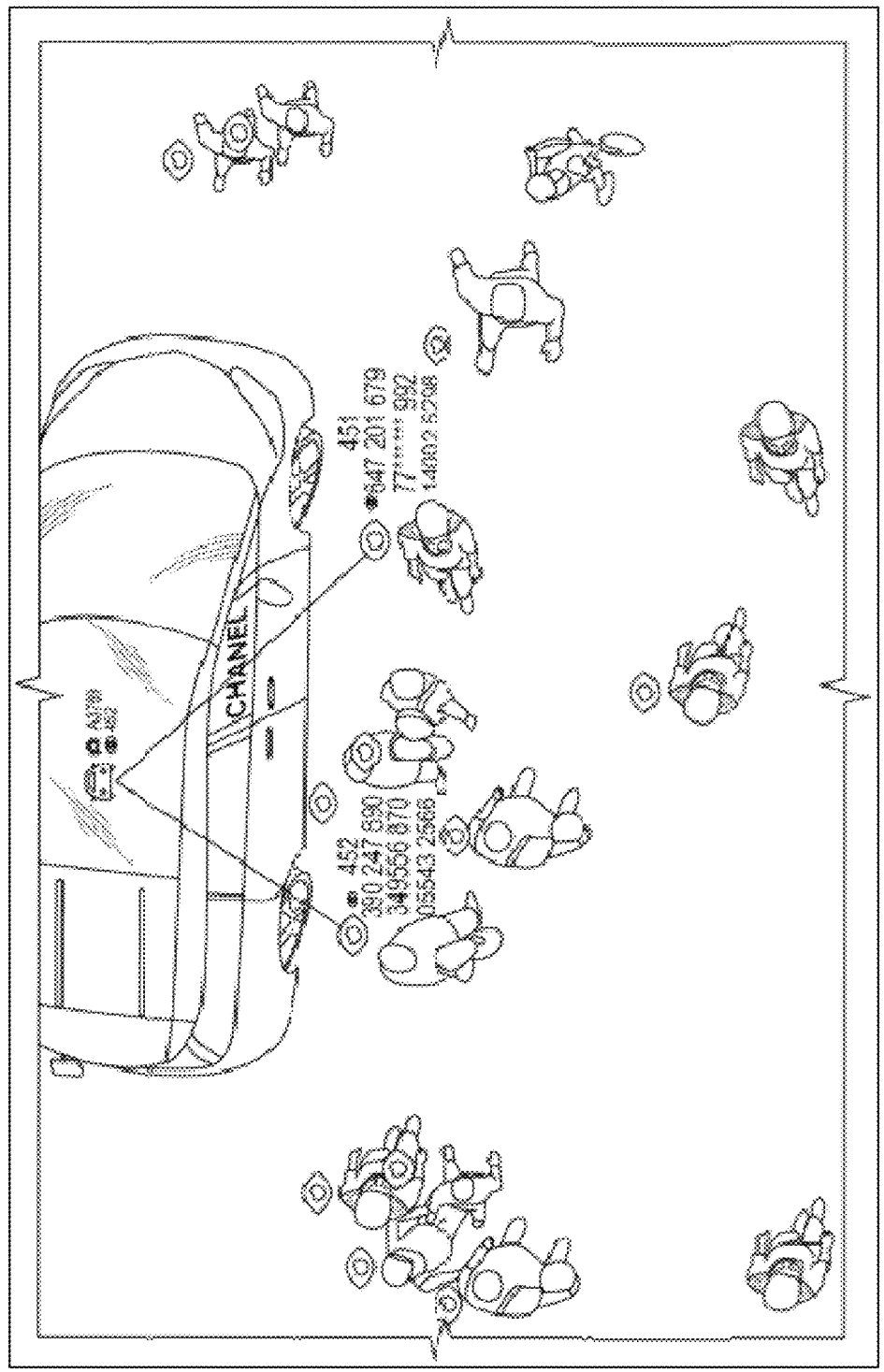

FIGS. 22A-22B illustrate aspects of real-time attribution of content consumption or interaction by pedestrians or other content consumers. For example, a vehicle may be equipped with one or more vehicle-based display systems. As the vehicle is moving, users may have their location reported as well. The system may detect when the users' locations are near the location of the vehicle-based display system and determine whether the user has passively or directly interacted with the content. Additionally, the vehicle-based display system may be equipped, or configured as a WiFi or Bluetooth beacon that allows tracking of passive locations of nearby devices. The WiFi beacons may enable a content management system to generate and display heat map capabilities to a publisher or content creator through an administration panel. For example, the beacons may use unique MAC addresses assigned to devices carried by consumers to detect when individual devices are in proximity to the content as it is being displayed. The WiFi or Bluetooth beacons, or other wireless access points, may be further able to estimate the distance of the device relative to the beacon based, for example, on time delays between the beacon sending a request and receiving a response. The request, which may be a probe request, may also attempt to register a hidden SSID associated with the content management system, particular publishers, or particular endpoints of the system.

Figure 23:
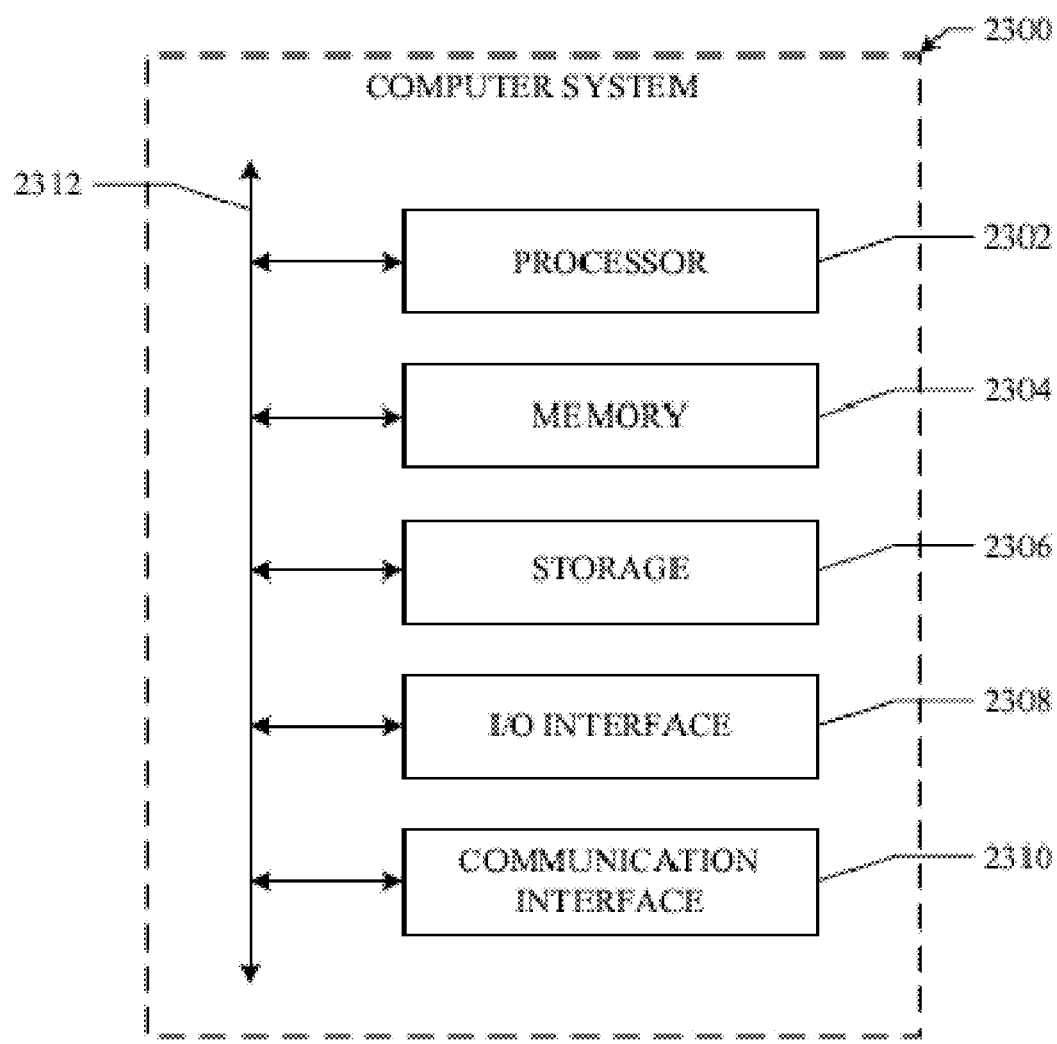
FIG. 23 illustrates an example computer system.

FIG. 23 illustrates an example computer system 2300. In particular embodiments, one or more computer systems 2300 perform one or more steps of one or more methods described or illustrated herein. In particular embodiments, one or more computer systems 2300 provide functionality described or illustrated herein. In particular embodiments, software running on one or more computer systems 2300 performs one or more steps of one or more methods described or illustrated herein or provides functionality described or illustrated herein. Particular embodiments include one or more portions of one or more computer systems 2300. Herein, reference to a computer system may encompass a computing device, and vice versa, where appropriate. Moreover, reference to a computer system may encompass one or more computer systems, where appropriate.

This disclosure contemplates any suitable number of computer systems 2300. This disclosure contemplates computer system 2300 taking any suitable physical form. As example and not by way of limitation, computer system 2300 may be an embedded computer system, a system on-chip (SOC), a single-board computer system (SBC) (such as, for example, a computer-on module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2300 may include one or more computer systems 2300; be unitary or distributed; span multiple locations; span multiple machines; span multiple data centers; or reside in a cloud, which may include one or more cloud components in one or more networks. Where appropriate. one or more computer systems 2300 may perform without substantial spatial or temporal limitation one or more steps of one or more methods described or illustrated herein. As an example and not by way of limitation, one or more computer systems 2300 may perform in real time or in batch mode one or more steps of one or more methods described or illustrated herein. One or more computer systems 2300 may perform at different times or at different locations one or more steps of one or more methods described or illustrated herein, where appropriate.

In particular embodiments, computer system 2300 includes a processor 2302, memory 2304, storage 2306, an input/output (I/O) interface 2308, a communication interface 2310, and a bus 2312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2302 includes hardware for executing instructions, such as those making up a computer program. As an example and not by way of limitation, to execute instructions, processor 2302 may retrieve (or fetch) the instructions from an internal register, an internal cache, memory 2304, or storage 2306; decode and execute them; and then write one or more results to an internal register, an internal cache, memory 2304, or storage 2306. In particular embodiments, processor 2302 may include one or more internal caches for data, instructions, or addresses. This disclosure contemplates processor 2302 including any suitable number of any suitable internal caches, where appropriate. As an example and not by way of limitation, processor 2302 may include one or more instruction caches, one or more data caches. and one or more translation lookaside buffers (TLBs). Instructions in the instruction caches may be copies of instructions in memory 2304 or storage 2306, and the instruction caches may speed up retrieval of those instructions by processor 2302. Data in the data caches may be copies of data in memory 2304 or storage 2306 for instructions executing at processor 2302 to operate on; the results of previous instructions executed at processor 2302 for access by subsequent instructions executing at processor 2302 or for writing to memory 2304 or storage 2306; or other suitable data. The data caches may speed up read or write operations by processor 2302. The TLBs may speed up virtual-address translation for processor 2302. In particular embodiments, processor 2302 may include one or more internal registers for data, instructions, or addresses. This disclosure contemplates processor 2302 including any suitable number of any suitable internal registers, where appropriate. Where appropriate, processor 2302 may include one or more arithmetic logic units (ALUs); be a multi-core processor; or include one or more processors 2302. Although this disclosure describes and illustrates a particular processor, this disclosure contemplates any suitable processor.

In particular embodiments, memory 2304 includes main memory for storing instructions for processor 2302 to execute or data for processor 2302 to operate on. As an example and not by way of limitation, computer system 2300 may load instructions from storage 2306 or another source (such as, for example, another computer system 2300) to memory 2304. Processor 2302 may then load the instructions from memory 2304 to an internal register or internal cache. To execute the instructions, processor 2302 may retrieve the instructions from the internal register or internal cache and decode them. During or after execution of the instructions, processor 2302 may write one or more results (which may be intermediate or final results) to the internal register or internal cache. Processor 2302 may then write one or more of those results to memory 2304. In particular embodiments, processor 2302 executes only instructions in one or more internal registers or internal caches or in memory 2304 (as opposed to storage 2306 or elsewhere) and operates only on data in one or more internal registers or internal caches or in memory 2304 (as opposed to storage 2306 or elsewhere). One or more memory buses (which may each include an address bus and a data bus) may couple processor 2302 to memory 2304. Bus 2312 may include one or more memory buses, as described below. In particular embodiments, one or more memory management units (MMUs) reside between processor 2302 and memory 2304 and facilitate accesses to memory 2304 requested by processor 2302. In particular embodiments, memory 2304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2304 may include one or more memories 2304, where appropriate. Although this disclosure describes and illustrates particular memory, this disclosure contemplates any suitable memory.

In particular embodiments, storage 2306 includes mass storage for data or instructions. As an example and not by way of limitation, storage 2306 may include a hard disk drive (HDD), a floppy disk drive, flash memory, an optical disc, a magneto-optical disc, magnetic tape, or a Universal Serial Bus (USB) drive or a combination of two or more of these. Storage 2306 may include removable or non-removable (or fixed) media, where appropriate. Storage 2306 may be internal or external to computer system 2300, where appropriate. In particular embodiments, storage 2306 is non-volatile, solid-state memory. In particular embodiments, storage 2306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2306 taking any suitable physical form. Storage 2306 may include one or more storage control units facilitating communication between processor 2302 and storage 2306, where appropriate. Where appropriate, storage 2306 may include one or more storages 2306. Although this disclosure describes and illustrates particular storage, this disclosure contemplates any suitable storage.

In particular embodiments, I/O interface 2308 includes hardware, software, or both providing one or more interfaces for communication between computer system 2300 and one or more I/O devices. Computer system 2300 may include one or more of these I/O devices, where appropriate. One or more of these I/O devices may enable communication between a person and computer system 2300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2308 for them. Where appropriate, I/O interface 2308 may include one or more device or software drivers enabling processor 2302 to drive one or more of these I/O devices. I/O interface 2308 may include one or more I/O interfaces 2308, where appropriate. Although this disclosure describes and illustrates a particular I/O interface, this disclosure contemplates any suitable I/O interface.

In particular embodiments, communication interface 2310 includes hardware, software, or both providing one or more interfaces for communication (such as, for example. packet-based communication) between computer system 2300 and one or more other computer systems 2300 or one or more networks. As an example and not by way of limitation, communication interface 2310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2310 for it. As an example and not by way of limitation, computer system 2300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2300 may include any suitable communication interface 2310 for any of these networks, where appropriate. Communication interface 2310 may include one or more communication interfaces 2310, where appropriate. Although this disclosure describes and illustrates a particular communication interface, this disclosure contemplates any suitable communication interface.

In particular embodiments, bus 2312 includes hardware, software, or both coupling components of computer system 2300 to each other. As an example and not by way of limitation, bus 2312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2312 may include one or more buses 2312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The claimed invention is:

1. A vehicle-based mobile content delivery system, comprising:
    a projector configured to receive visual content from one or more sources through an input/output (I/O) interface and project visual content related to multimedia including broadcasting of content, advertising, emergency information, specific content to children and the like onto a window of a vehicle as a projection surface, wherein one or more sources comprise a local storage, nearby storage, remote storage, and cloud provider and wherein the projector further comprises a screw hole and a tripod projector coupling mechanism;

a projector mounting system configured for securely mounting the projector and integrating the projector into the vehicle, the projector mounting system further comprising:

a headrest projector mount configured to enclose and support the projector, wherein the headrest projector mount is further configured to be compatible for replacing an original headrest of the vehicle;

a headrest coupling mechanism for coupling the projector to the headrest projector mount for support, wherein the headrest coupling mechanism is configured to couple with the tripod projector coupling mechanism; and one or more mounting channels located adjacent to the headrest coupling mechanism, wherein a mounting structure to connect the projector with the headset of the vehicle are disposed within the mounting channels to connect the projector mounting system to the vehicle, and wherein the mounting channels are configured to adjustably accommodate a plurality of configurations of the mounting structure.

2. The vehicle-based mobile content delivery system of claim 1, wherein the tripod projector coupling mechanism comprises one or more mounting holes.

3. The vehicle-based mobile content delivery system of claim 1, wherein the headrest projector mount further comprises a headrest cover for concealing the projector, wherein the headrest cover is cosmetically similar to the original headrest of the vehicle.

4. The vehicle-based mobile content delivery system of claim 1, wherein the headrest coupling mechanism comprises a ball joint and a collar, wherein the collar is configured to enable control of motion of the ball joint or immobilize the ball joint.

5. The vehicle-based mobile content delivery system of claim 4, wherein the headrest coupling mechanism further comprises a ball joint insert.

6. The vehicle-based mobile content delivery system of claim 4, wherein the collar further comprises an aperture.

7. The vehicle-based mobile content delivery system of claim 4, wherein a ball portion of the ball joint further comprises a bolt that extends outward from an extending member of the ball portion.

8. The vehicle-based mobile content delivery system of claim 1, wherein the one or more mounting channels are further configured to permit lateral adjustment of the headrest projector mount.

9. The vehicle-based mobile content delivery system of claim 1, wherein the headrest projector mount is further configured to be functionally similar to the original headrest of the vehicle.

10. The vehicle-based mobile content delivery system of claim 1, wherein the projection mounting system further comprises a projector cover.

11. The vehicle-based mobile content delivery system of claim 1, wherein the headrest projector mount is configured to direct the screw hole of the projector toward the projection surface attached to a rear window of the vehicle.

12. The vehicle-based mobile content delivery system of claim 1, wherein the headrest projector mount is configured to direct the screw hole of the projector toward the projection surface attached to a side window of the vehicle.

\* \* \* \* \*